US012809150B2

(12) United States Patent
Wang et al.

(10) Patent No.: US 12,809,150 B2
(45) Date of Patent: Nov. 24, 2026

(54) MULTISCALE MULTIVIEW LIGHT-SHEET IMAGING

(71) Applicant: Howard Hughes Medical Institute, Chevy Chase, MA (US)

(72) Inventors: Chen Wang, Ashburn, VA (US); Philipp Johannes Keller, Ashburn, VA (US)

(73) Assignee: Howard Hughes Medical Institute, Chevy Chase, MD (US)

( * ) Notice: Subject to any disclaimer, the term of this patent is extended or adjusted under 35 U.S.C. 154(b) by 175 days.

(21) Appl. No.: 18/691,306

(22) PCT Filed: Sep. 21, 2022

(86) PCT No.: PCT/US2022/044224

§ 371 (c)(1),
(2) Date: Mar. 12, 2024

(87) PCT Pub. No.: WO2023/049164

PCT Pub. Date: Mar. 30, 2023

(65) Prior Publication Data

US 2024/0427129 A1 Dec. 26, 2024

Related U.S. Application Data

(60) Provisional application No. 63/247,035, filed on Sep. 22, 2021.

(51) Int. Cl.
*G02B 21/00* (2006.01)
*G02B 21/36* (2006.01)

(52) U.S. Cl.
CPC ....... *G02B 21/0076* (2013.01); *G02B 21/006* (2013.01); *G02B 21/367* (2013.01)

(58) Field of Classification Search
CPC .............. G01N 21/6458; G02B 21/006; G02B 21/0076; G02B 21/16; G02B 21/367
See application file for complete search history.

(56) References Cited

U.S. PATENT DOCUMENTS 8,570,649 B2 10/2013 Truong et al.
8,575,570 B2 11/2013 Choi et al.
(Continued)

FOREIGN PATENT DOCUMENTS

| | | | |
|---|---|---|---|
| EP | 3121637 | A1 | 1/2017 |
| WO | 2016156541 | A3 | 12/2016 |
| WO | 2020058556 | A1 | 3/2020 |

OTHER PUBLICATIONS

Tae Wook Park, Korean International Searching Authority, International Search Report and Written Opinion, counterpart PCT Application No. PCT/US2022/044224, mailed Jan. 18, 2023. 13 pages total.

(Continued)

*Primary Examiner* — Peter D Le
(74) *Attorney, Agent, or Firm* — DiBerardino McGovern IP Group LLC

(57) ABSTRACT

A microscope system includes at least one illumination subsystem configured to produce and direct a light sheet toward a specimen region. The illumination subsystem includes a spatial adjustment apparatus configured to operate in a plurality of different modes, each operating mode configured to produce a light sheet having a different spatial status. The microscope system includes at least one detection subsystem arranged to collect fluorescence emitted from the specimen region due to an interaction between a specimen at the specimen region and a light sheet. The at least one detection subsystem includes a plurality of imaging devices, with each imaging device being associated with a different spatial status such that each imaging device is configured to (Continued)

record images of the fluorescence due to an interaction between a specimen at the specimen region and the light sheet of the associated spatial status.

37 Claims, 14 Drawing Sheets

(56) References Cited

U.S. PATENT DOCUMENTS

| | | | | |
|---|---|---|---|---|
| 8,792,162 | B2 | 7/2014 | Lippert et al. | |
| 9,134,521 | B2 | 9/2015 | Huisken | |
| 9,404,869 | B2 | 8/2016 | Keller | |
| 10,190,867 | B2 | 1/2019 | Safrani et al. | |
| 10,295,814 | B2 | 5/2019 | Siebenmorgen et al. | |
| 10,539,772 | B2 | 1/2020 | Keller et al. | |
| 10,746,981 | B2 | 8/2020 | Tomer et al. | |
| 10,884,227 | B2 | 1/2021 | Tomer | |
| 2005/0178968 | A1* | 8/2005 | Nesnidal | G01J 3/08 250/339.07 |
| 2005/0185178 | A1* | 8/2005 | Gardner, Jr. | G01N 21/65 356/301 |
| 2006/0139746 | A1* | 6/2006 | Delaage | G02B 21/02 359/368 |
| 2008/0004185 | A1* | 1/2008 | Labgold | C12Q 1/6825 506/9 |
| 2009/0237501 | A1* | 9/2009 | Lemmer | G02B 21/0076 348/79 |
| 2011/0134521 | A1* | 6/2011 | Truong | G02B 21/367 359/388 |
| 2014/0099659 | A1* | 4/2014 | Keller | G02B 21/362 435/29 |
| 2014/0301535 | A1* | 10/2014 | Williams | G01N 23/20066 378/87 |
| 2014/0346328 | A1* | 11/2014 | Niu | G01N 21/47 250/225 |
| 2015/0098126 | A1* | 4/2015 | Keller | G02B 21/367 359/385 |
| 2016/0195705 | A1* | 7/2016 | Betzig | G02B 27/58 348/79 |
| 2018/0045941 | A1* | 2/2018 | Gao | G01N 15/1456 |
| 2018/0081159 | A1 | 3/2018 | Lippert et al. | |
| 2018/0149854 | A1 | 5/2018 | Siebenmorgen et al. | |
| 2019/0310451 | A1* | 10/2019 | Tomer | G02B 21/0032 |
| 2020/0004002 | A1 | 1/2020 | Tille et al. | |
| 2020/0050830 | A1* | 2/2020 | Krueger | G06F 18/214 |
| 2020/0408691 | A1 | 12/2020 | Vladimirov et al. | |
| 2021/0372945 | A1* | 12/2021 | Weiss | G01N 21/8806 |

OTHER PUBLICATIONS

Sole® Laser Light Engine produced by Omicron-Laserprodukte GmbH of Rodgau-Dudenhofen, Germany (http://www.omicron-laser.de/) Accessed Jan. 24, 2024.

Jeremy Freeman, et al., “Mapping brain activity at scale with cluster computing,” Jul. 27, 2014, Nature Methods 11, 941-950, Advance Online Publication.

* cited by examiner

MULTISCALE MULTIVIEW LIGHT-SHEET IMAGING

CROSS REFERENCE TO RELATED APPLICATION

This application claims the benefit of U.S. Application No. 63/247,035, filed Sep. 22, 2021, and titled MULTI-SCALE MULTIVIEW LIGHT-SHEET IMAGING, which is incorporated herein by reference in its entirety.

TECHNICAL FIELD

The disclosed subject matter relates to live imaging of biological specimens.

BACKGROUND

Understanding the development and function of complex biological specimens relies critically on our ability to record and quantify fast spatio-temporal dynamics on a microscopic scale. Owing to the fundamental trade-off between spatial resolution, temporal resolution, and photo-damage, the practical approach in biological live imaging has been to reduce the observation of large specimens to small functional subunits and to study these one at a time.

In multiview light-sheet imaging, a live biological specimen is imaged by illuminating the specimen with a thin (for example, on the order of μm) light sheet extending along a light sheet axis and collecting the resulting fluorescence along a detection axis that is not parallel with (for example, is perpendicular to) the light sheet axis. The light sheet is scanned across the specimen in steps along the detection axis in order to obtain a three-dimensional representation (image) of the specimen. Multiview light-sheet imaging provides fast three-dimensional imaging of biological specimens at high spatial resolution and with an excellent signal-to-noise ratio, while keeping photo-bleaching and phototoxic effects at a minimum.

SUMMARY

In some general aspects, a microscope system includes: at least one illumination subsystem configured to produce and direct a light sheet toward a specimen region, and at least one detection subsystem arranged to collect fluorescence emitted from the specimen region due to an interaction between a specimen at the specimen region and a light sheet. The illumination subsystem includes a spatial adjustment apparatus configured to operate in a plurality of different modes, each operating mode configured to produce a light sheet having a different spatial status. The at least one detection subsystem includes a plurality of imaging devices, with each imaging device being associated with a different spatial status such that each imaging device is configured to record images of the fluorescence due to an interaction between a specimen at the specimen region and the light sheet of the associated spatial status.

Implementations can include one or more of the following features. For example, the illumination subsystem can include a light source and a set of illumination optical devices, at least some of the illumination optical devices forming the spatial adjustment apparatus.

At least one of the spatial statuses of the light sheet can be a large field of view and at least one of the spatial statuses of the light sheet can be a small field of view. The spatial status of the light sheet at the large field of view can produce images at a resolution that captures cellular structure within a biological specimen, and the spatial status of the light sheet at the small field of view can produce images at sub-micron resolution.

Each spatial status of the light sheet can define a different field of view and a different resolution of the light sheet, and an imaging device being associated with a particular spatial status has an optical spatial resolution and a magnification that is associated with the particular field of view and resolution of the light sheet with that particular spatial status.

The microscope system can further include a control system in communication with the at least one illumination subsystem and the at least one detection subsystem. The control system can be configured to select and implement a second spatial status of the light sheet based on an analysis of an image of fluorescence recorded at a first imaging device due to the interaction at the specimen region between the specimen and the light sheet operating in a first spatial status. The control system can be configured to select and implement a second spatial status of the light sheet by selecting a pre-determined spatial status associated with the first spatial status. Images of fluorescence recorded at a first imaging device can provide a large field of view map of a specimen at the specimen region, and the control system can analyze the large field of view map to determine a small field of view of the specimen to image with a second imaging device, the small field of view being smaller than the large field of view. Images of fluorescence recorded at a first imaging device can provide a large field of view map of a specimen at the specimen region, and the control system can select one or more pre-determined small fields of view of the specimen to image with a second imaging device, each small field of view being smaller than the large field of view. The control system can include an imaging module configured to create a three-dimensional image of the specimen based on the recorded images of fluorescence. The control system can include: an imaging module configured to analyze images from each imaging device; and an illumination mode module that is configured to send a signal to the illumination subsystem to control operation of the spatial adjustment apparatus based on the analysis performed by the imaging module. The imaging module being configured to analyze images from each imaging device can include the imaging module being configured to determine a location of the light sheet in the specimen region, and the illumination mode module being configured to send the signal to the illumination subsystem can include instructing a modification of the spatial adjustment apparatus based on the determined light sheet location.

The light sheet can be directed toward the specimen region along an illumination direction that is parallel with an illumination axis. The at least one detection subsystem can be arranged to collect fluorescence emitted from the specimen region along a detection collection direction that is divergent with or perpendicular to the illumination axis. The at least one detection subsystem can include a plurality of detection subsystems, with each detection subsystem being arranged to collect fluorescence emitted from the specimen region along a detection collection direction that is divergent with or perpendicular to the illumination axis. The at least one illumination subsystem can include a plurality of illumination subsystems, with each illumination subsystem being configured to produce and direct a respective light sheet toward the specimen region along a respective illumination direction that is parallel with the illumination axis.

Each spatial adjustment apparatus can include a beam shaping apparatus configured to control a volume of the light sheet within the specimen region. A spatial status of the light sheet can be defined at least in part by the shape of the light sheet and/or the volume of the light sheet within the specimen region. The beam shaping apparatus can include a phase control device. The phase control device can include a spatial light modulator, a deformable device, a digital micro-mirror device, or a dielectric optical metasurface.

The illumination subsystem can include an illumination objective in direct optical path adjacent the specimen region and the detection subsystem can include a detection objective in direct optical path adjacent the specimen region. The spatial adjustment apparatus can exclude the illumination objective. Each imaging device of the detection subsystem can be associated with a respective focus adjustment apparatus configured to independently adjust a focus of the fluorescence at the imaging device.

In other general aspects, a specimen at a specimen region is imaged by a method. The method includes: generating a light sheet associated with a larger field of view within the specimen region and directing the light sheet associated with the larger field of view along an illumination direction that is parallel with an illumination axis to the specimen region; recording, at the larger field of view, an image of fluorescence emitted along a detection direction that is parallel with a detection axis that is divergent with or perpendicular with the illumination axis, the fluorescence emitted from a specimen in the specimen region due to an interaction between the light sheet associated with the larger field of view and the specimen; determining a smaller field of view within the larger field of view based on an analysis of the recorded image of fluorescence at the larger field of view; generating a light sheet associated with the determined smaller field of view within the specimen region and directing the light sheet associated with the determined smaller field of view along the illumination direction that is parallel with the illumination axis to the specimen region; and recording, at the smaller field of view, an image of fluorescence emitted along the detection direction that is parallel with the detection axis, the fluorescence emitted from a specimen in the specimen region due to an interaction between the light sheet associated with the smaller field of view and the specimen.

Implementations can include one or more of the following features. For example, the smaller field of view within the larger field of view can be determined by determining a plurality of smaller fields of view within the specimen region based on the analysis of the recorded image of fluorescence at the larger field of view. The light sheet associated with the determined smaller field of view can be generated within the specimen region and the light sheet associated with the determined smaller field of view can be directed along the illumination direction that is parallel with the illumination axis to the specimen region by generating a plurality of light sheets, each light sheet associated with one of the determined smaller fields of view within the specimen region and directing each of the light sheets associated with the determined smaller fields of view along the illumination direction that is parallel with the illumination axis to the specimen region. The plurality of light sheets associated with the smaller fields of view can be directed along the illumination direction that is parallel with the illumination axis by directing the plurality of light sheets associated with the smaller fields of view such that they temporally overlap with each other in the specimen region and spatially overlap with the larger field of view within the specimen region. The plurality of light sheets associated with each smaller field of view can be directed along the illumination direction by directing the plurality of light sheets associated with each smaller field of view such that they arrive sequentially in time in the specimen region.

An image of fluorescence emitted along the detection direction that is parallel with the detection axis can be recorded at the smaller field of view by recording the image at a resolution that is higher than a resolution at which the image of fluorescence is recorded at the larger field of view.

The light sheet associated with the larger field of view can be generated within the specimen region by generating a plurality of light sheets associated with the larger field of view within the specimen region, and directing the light sheet associated with the larger field of view along the illumination direction can include directing the plurality of light sheets associated with the larger field of view along respective illumination directions, each illumination direction being parallel with the illumination axis. The respective illumination directions can be opposite to each other.

The image of fluorescence emitted along the detection direction that is parallel with the detection axis can be recorded at the larger field of view by recording, at each of a plurality of distinct larger fields of view, an image of fluorescence emitted along a distinct detection direction, each detection direction being parallel with the detection axis that is divergent with or perpendicular with the illumination axis, the fluorescence being emitted from the specimen in the specimen region due to an interaction between the light sheet associated with the larger field of view and the specimen.

The image of fluorescence emitted along the detection direction that is parallel with the detection axis can be recorded at the smaller field of view by recording, at each of a plurality of distinct smaller fields of view, an image of fluorescence emitted along a distinct detection direction, each detection direction being parallel with the detection axis that is divergent with or perpendicular with the illumination axis, the fluorescence being emitted from the specimen in the specimen region due to an interaction between the light sheet associated with the smaller field of view and the specimen. The image of fluorescence can be recorded, at the smaller field of view, by recording at a temporal resolution on the order of a millisecond.

The method can further include analyzing the recorded image of fluorescence at the larger field of view including creating an image map of the specimen within the larger field of view, determining which target location within the image map should be imaged next, and selecting the smaller field of view based on the determined target location. The image of fluorescence can be recorded, at the larger field of view, by recording at a lower resolution that captures activity of cells within the specimen. The image of fluorescence can be recorded, at the smaller field of view, by recording at a higher resolution that captures neuronal activity within the larger field of view of the specimen. Determining which target location within the image map should be imaged next can include identifying a population of neuronal activity involved in a behavior of interest.

The method can further include sequentially selecting larger fields of view within the specimen region, and for each larger field of view, performing: generating a light sheet associated with the larger field of view within the specimen region and directing the light sheet associated with the larger field of view along an illumination direction that is parallel with the illumination axis to the specimen region; recording, at the larger field of view, an image of fluorescence emitted along a detection direction that is parallel with the detection axis, the fluorescence emitted from the specimen in the specimen region due to an interaction between the light sheet associated with the larger field of view and the specimen; determining a smaller field of view within the larger field of view based on an analysis of the recorded image of fluorescence at the larger field of view; generating a light sheet associated with the determined smaller field of view within the specimen region and directing the light sheet associated with the determined smaller field of view along the illumination direction; and recording, at the smaller field of view, an image of fluorescence emitted along the detection direction, the fluorescence emitted from the specimen in the specimen region due to an interaction between the light sheets associated with the smaller field of view and the specimen. The method can also include creating a three-dimensional image of the specimen based on the recorded images of fluorescence.

The light sheet associated with the larger field of view can be generated within the specimen region by generating the light sheet having a first spatial status and the light sheet associated with the smaller field of view can be generated within the specimen region by generating the light sheet having a second spatial status that is different from the first spatial status. The first spatial status can correspond to a first volume of the light sheet that interacts with the specimen in the specimen region and the second spatial status can correspond to a second volume of the light sheet that interacts with the specimen in the specimen region.

DETAILED DESCRIPTION

Figure 1:
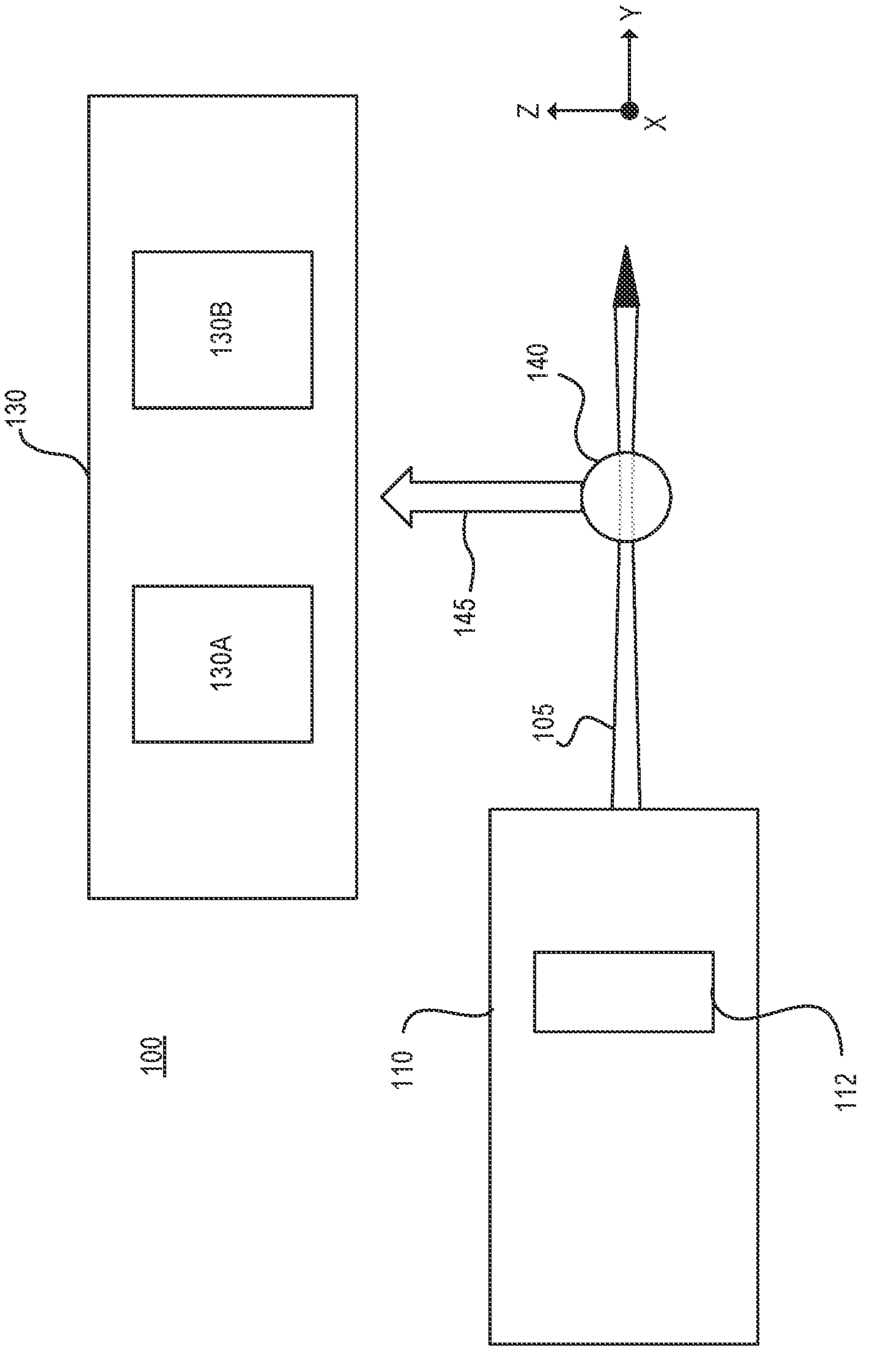
FIG. 1 is a schematic diagram of a microscope system including an illumination subsystem producing a light sheet directed to a specimen and a detection subsystem collecting fluorescence emitted from the specimen, the microscope system enabling multiscale interrogation of the specimen.

Referring to FIG. 1, a microscope system 100 is shown. The microscope system 100 includes at least one illumination subsystem 110 and at least one detection subsystem 130 arranged relative to the illumination subsystem 110. The illumination subsystem 110 is configured to produce and direct a light sheet 105 toward a specimen region 140 and the detection subsystem 130 is arranged to collect fluorescence 145 emitted from the specimen region 140. The fluorescence 145 is produced during an interaction between a specimen (such as biological specimen) at the specimen region 140 and the light sheet 105.

The microscope system 100 is designed to enable multiscale interrogation of the specimen placed in the specimen region 140 by interleaving image acquisition (at the detection system 130) at two different spatial statuses such that images at two different spatial statuses (or scales) are captured. Each spatial status can correspond to a spatial scale or a field of view at the specimen region 140. For example, a first spatial status can correspond to a larger scale or a larger field of view over a spatial level of a millimeter (mm) or on the order of a mm and a second spatial status can correspond to a smaller, local scale or a smaller field of view of over a spatial range of micrometers (μm) (for example, tens of μm or a few hundreds of μm). The maximum imaging speed of each spatial scale can be maintained by interleaving light-sheet illumination in a cycle of a few milliseconds (ms). The microscope system 100 is designed so that each spatial status corresponds to a distinct optical spatial resolution and magnification, and light-sheet illumination at each scale is tailored to a different spatial status using a spatial adjustment apparatus 112. Both kinds of imaging achieve good signal-to-noise ratios with diffraction-limited optical performance.

In this way, the microscope system 100 balances spatial resolution, speed, and image field of view during imaging of a specimen at the specimen region 140. In particular, in prior microscopes, high resolution imaging tends to occur for a smaller field of view while having a larger field of view results in lower spatial resolution or lower speed. By contrast, the microscope system 100 does not force the user to choose between viewing fine details or viewing a bigger picture of the specimen. Thus, the user can see both with the microscope system 100.

As one particular example, the microscope system 100 can enable multiscale interrogation of neuronal circuits in behaving vertebrates with optically transparent brains. For example, synaptic activity such as the activity of individual synapses, which is vital for a wide range of neurobiological functions, can be imaged. The microscope system 100 maintains single-synapse resolution across a sufficiently large spatial scale to cover an entire brain while also maintaining millisecond temporal resolution that is important for capturing fast synaptic transmissions.

With reference again to FIG. 1, in its simplest scenario, the microscope system 100 includes a single light sheet 105 produced by a single illumination subsystem 110 and includes a single detection subsystem 130 arranged to capture or collect the fluorescence 145 traveling from the specimen region 140 and along a direction that is divergent with a direction along which the light sheet 105 is directed. The fluorescence is produced from an interaction between a specimen at the specimen region 140 and the light sheet 105. A direction is divergent with another direction if it is not parallel and not antiparallel with that other direction. Thus, a direction that is perpendicular to another direction is also divergent with that other direction. For example, within the specimen region 140, the light sheet 105 propagates along a direction that is parallel with the Y axis of an X, Y, Z coordinate system of the specimen region 140. The light sheet 105 has an extent generally along the X axis, and a width of the light sheet 105 is defined along the Z axis. As shown in FIG. 1, the fluorescence 145 that is captured by the detection subsystem 130 is traveling along a direction that is parallel with the Z axis of the X, Y, Z coordinate system. When used herein, the X, Y, Z coordinate system is fixed relative to the specimen region 140, and thus references made to the X axis, the Y axis, and the Z axis are made relative to the specimen region 140. In some implementations, the XY plane can be vertically arranged, that is, aligned with the gravitational pull of the earth. In other implementations, the XY plane can be horizontally arranged, that is, perpendicular with the earth's gravitational pull.

The illumination subsystem 110 includes the spatial adjustment apparatus 112, which is configured to operate, at any moment in time, in one of a plurality of different modes. Each operating mode of the spatial adjustment apparatus 112 corresponds to a distinct spatial status of the light sheet 105 that is produced by the illumination subsystem 110. Thus, each operating mode of the spatial adjustment apparatus 112 produces a light sheet 105 having a different spatial status. To this end, the detection subsystem 130 includes a plurality of imaging devices 130A, 130B Each imaging device 130A, 130B is configured to record images of fluorescence that is produced from an interaction between the specimen at the specimen region 140 and a light sheet 105 having an associated spatial status. The images are taken at each XY image plane of the specimen (within the specimen region 140), as discussed next with reference to FIGS. 2A and 2B.

In order to produce the light sheet 105, as discussed below in greater detail, an optical scanner device within the illumination subsystem 110 rapidly moves a thin (for example, a μm-thick) beam of light along an illumination axis (the X axis), which is perpendicular to the Y and Z axes of the specimen region 140, to form a light beam that extends generally along or parallel with a plane to form the light sheet 401. Rapid scanning of a thin volume and fluorescence detection at a right angle (in this example, along the Z axis) to the illumination axis provides an optically sectioned image (in the XY image plane). The light sheet 105 excites fluorophores within the specimen into higher energy levels, which then results in the subsequent emission of a fluorescence photon P, and the fluorescence photons P are detected by the imaging device 130A or 130B within the detection subsystem 130 (in the XY image plane and at a step along the Z axis). The fluorophores that are excited in the specimen can be labels that are attached to the cells, such as, for example, genetically-encoded fluorescent proteins such as GFP, genetically-encoded calcium indicators, or dyes such as Alexa-488. However, the fluorophores can, in some implementations that use second-harmonic generation or third-harmonic generation, be actual or native proteins within the cells that emit light of specific wavelengths upon exposure with the light sheet 105.

Figure 2A:
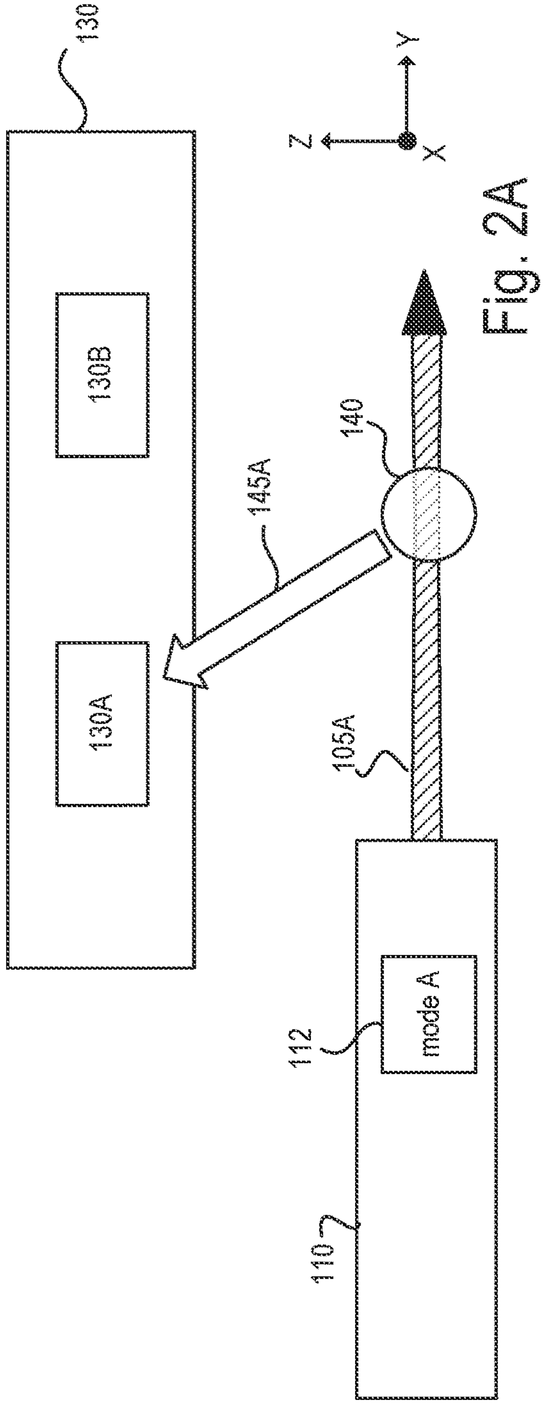
FIG. 2A is a schematic diagram of the microscope system of FIG. 1 in which the illumination subsystem operates in mode A, the light sheet has spatial status A, and imaging occurs at imaging device A in the detection subsystem.
Figure 2B:
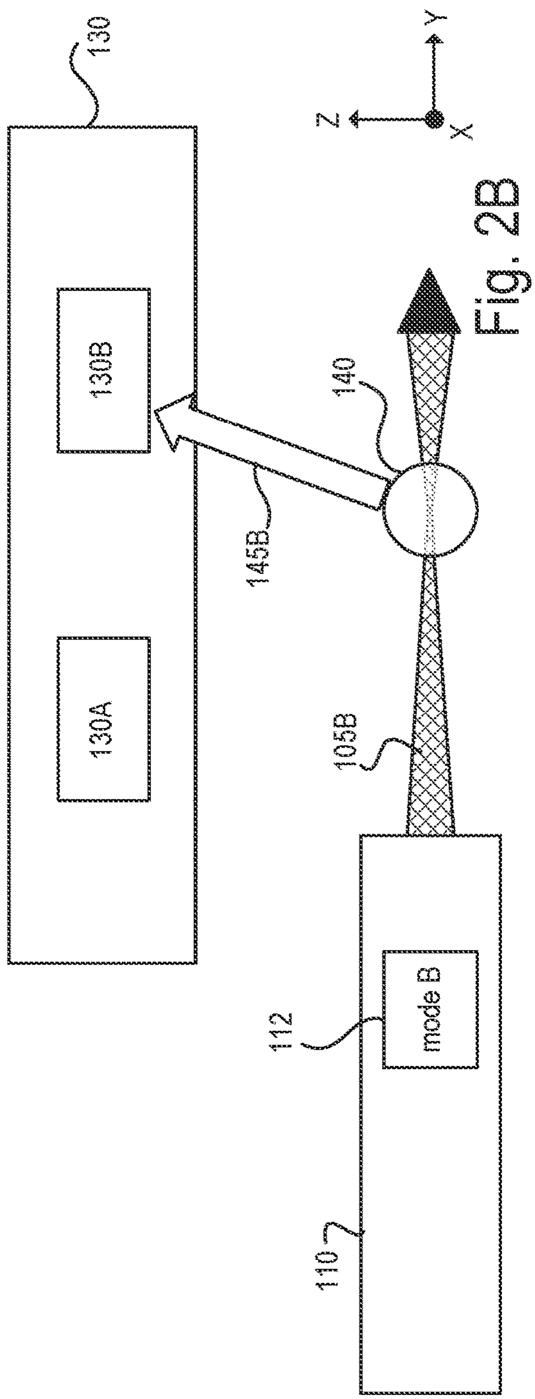
FIG. 2B is a schematic diagram of the microscope system of FIG. 1 in which the illumination subsystem operates in mode B, the light sheet has spatial status B, and imaging occurs at imaging device B in the detection subsystem.

As shown in FIG. 2A, the imaging device 130A is associated with a spatial status A. The spatial adjustment apparatus 112 operates in mode A during which the illumination subsystem 110 produces a light sheet 105A having the spatial status A. The detection subsystem 130 is configured to direct the fluorescence 145A that is produced from the interaction between the specimen in the specimen region 140 and the light sheet 105A to the imaging device 130A. As shown in FIG. 2B, the imaging device 130B is associated with a spatial status B. The spatial adjustment apparatus 112 operates in mode B during which the illumination subsystem 110 produces a light sheet 105B having the spatial status B. The detection subsystem 130 is configured to direct the fluorescence 145B that is produced from the interaction between the specimen in the specimen region 140 and the light sheet 105B to the imaging device 130B.

While two imaging devices 130A, 130B are shown, the detection subsystem 130 can include more than two imaging devices 130A, 130B and the spatial adjustment apparatus 112 can operate in more than two modes. For example, there could be three modes of operation A, B, C of the spatial adjustment apparatus 112; one of the modes (the A mode) can correspond to a large scale, wide field of view and the other two modes (the B and C modes) can correspond to two local scales within that wide field of view.

As mentioned above, a spatial status of a light sheet 105 can correlate to a field of view at which the fluorescence 145 is imaged at the detection subsystem. The field of view at an imaging device 130A or 130B corresponds to the extent of the observable specimen (in the specimen region 140) that is seen at any given moment. Thus, it can correspond to a solid angle through which a detector of the imaging device 130A, 130B is sensitive to electromagnetic radiation (that is, the fluorescence 145). The field of view of the imaging device 130A, 130B can also be considered as the field over which the imaging device 130A, 130B exhibits good performance.

In some implementations, the spatial status of the light sheet 105 is a volume and/or a shape of the light sheet 105 within the specimen region 140. The spatial adjustment apparatus 112 is configured to toggle between different shapes of the light sheet 105 within the specimen region 140 depending on how many modes of operation are obtainable at the spatial adjustment apparatus 112. By changing the shape of the light sheet 105 within the specimen region 140, the volume with which the light sheet 105 interacts with the specimen in the specimen region 140 changes. This, in turn changes the field of view that is imaged at the imaging device 130A or 130B. For example, if the spatial status of the light sheet 105A is a relatively larger volume of the light sheet 105A in the specimen region 140, then more volume of the specimen is interacting with the light sheet 105A and the field of view of the imaging device 130A should be wider or larger. By contrast, if the spatial status of the light sheet 105B is a relatively smaller volume of the light sheet 105B in the specimen region 140, then a reduced or less volume of the specimen is interacting with the light sheet 105B and the field of view of the imaging device 130B should be narrower or smaller. The imaging device 130A has an optical spatial resolution and a magnification that is associated with its field of view, and the imaging device 130B has an optical spatial resolution and a magnification that is associated with its field of view. In this particular example, the resolution of the images captured at the imaging device 130B is better than the resolution of the images captured at the imaging device 130A and the magnification is greater at the imaging device 130B than at the imaging device 130A. For example, the imaging device 130B captures images at sub-micrometer resolution while the imaging device 130A captures images at the resolution of cellular structure within a biological specimen.

In some implementations, the spatial adjustment apparatus 112 includes a beam shaping apparatus, which can be a phase control device. The phase control device can be a spatial light modulator, a deformable device, a digital micromirror device, or a dielectric optical metasurface. The spatial adjustment apparatus 112 can be a dedicated optical element within the illumination subsystem. That is, the spatial adjustment apparatus 112 can be distinct from the other optical elements of the illumination subsystem that are used for producing the light sheet 105, directing the light sheet 105, and/or focusing the light sheet 105 to the specimen region 140.

Figure 3:
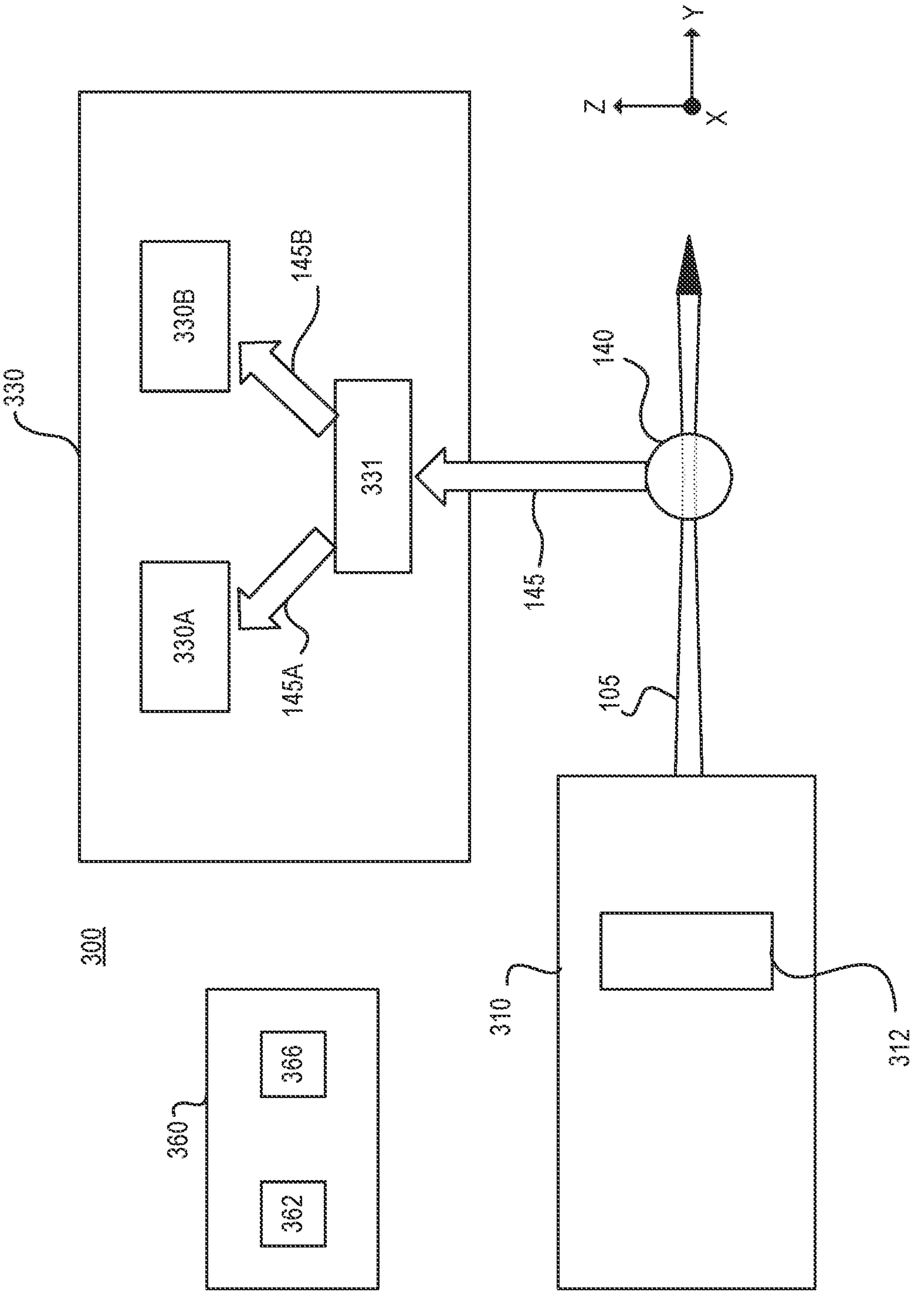
FIG. 3 is a schematic diagram of an implementation of the microscope system of FIG. 1, including a control system and a beam steering device within the detection subsystem.

Referring to FIG. 3, an implementation 300 of the microscope system 100 includes a control system 360, an illumination subsystem 310 (which is an implementation of the illumination subsystem 110) including the spatial adjustment apparatus 312, and a detection subsystem 330 (which is an implementation of the detection subsystem 330) including imaging devices 330A, 330B. The control system 360 is in communication with the illumination subsystem 310 and the detection subsystem 330. The control system 360 provides an electronics framework that includes an actuation apparatus 362 and a computational apparatus 366 that communicates with the actuation apparatus 362. The actuation apparatus 362 provides synchronized control of all opto-mechanical components within the microscope system 300 with high (for example, millisecond) precision and over long periods of time. The computational apparatus 366 provides a robust pipeline for high-speed image acquisition with a plurality of imaging devices 330A, 330B (or cameras) within the detection subsystem 330 at sustained data rates and a computational strategy for efficient and automated image processing to register and reconstruct the vast amount of raw image data arising from a single specimen. Details about the control system 360 are discussed with reference to FIG. 10.

The detection subsystem 330 includes a beam steering device 331 that toggles the fluorescence 145 as 145A and 145B, respectively, between the two imaging devices 130A and 130B. The beam steering device 331 performs this toggling based on the spatial status of the spatial adjustment apparatus 312 and under the instruction of the control system 360, and specifically the actuation apparatus 362. In some implementations, the beam steering device 331 includes a galvanometer that is in communication with the actuation apparatus 362 and is physically coupled to an optical element (such as a mirror) in the path of the fluorescence 145. The galvanometer switches the optical element between providing the fluorescence 145A to the imaging device 330A and providing the fluorescence 145B to the imaging device 330B. This switching can be based on a precise time sequence triggered by the actuation apparatus 362 under control of the computational apparatus 366. For example, at time 1-3 millisecond (ms), the beam steering device 331 directs the fluorescence 145A to the imaging device 330A and while the spatial adjustment apparatus 312 operates in mode A during which the illumination subsystem 310 produces the light sheet 105A having the spatial status A; at time 3-5 ms, the beam steering device 331 directs the fluorescence 145B to the imaging device 330B and while the spatial adjustment apparatus 312 operates in mode B during which the illumination subsystem 310 produces the light sheet 105B having the spatial status B; at time 5-7 ms, the beam steering device 331 again directs the fluorescence 145A to the imaging device 330A and while the spatial adjustment apparatus 312 operates in mode A during which the illumination subsystem 310 produces the light sheet 105A having the spatial status A; and at time 7-9 ms, the beam steering device 331 directs the fluorescence 145B to the imaging device 330B and while the spatial adjustment apparatus 312 operates in mode B during which the illumination subsystem 310 produces the light sheet 105B having the spatial status B. In this particular example, a full imaging cycle is completed in 4 ms.

Figure 4A:
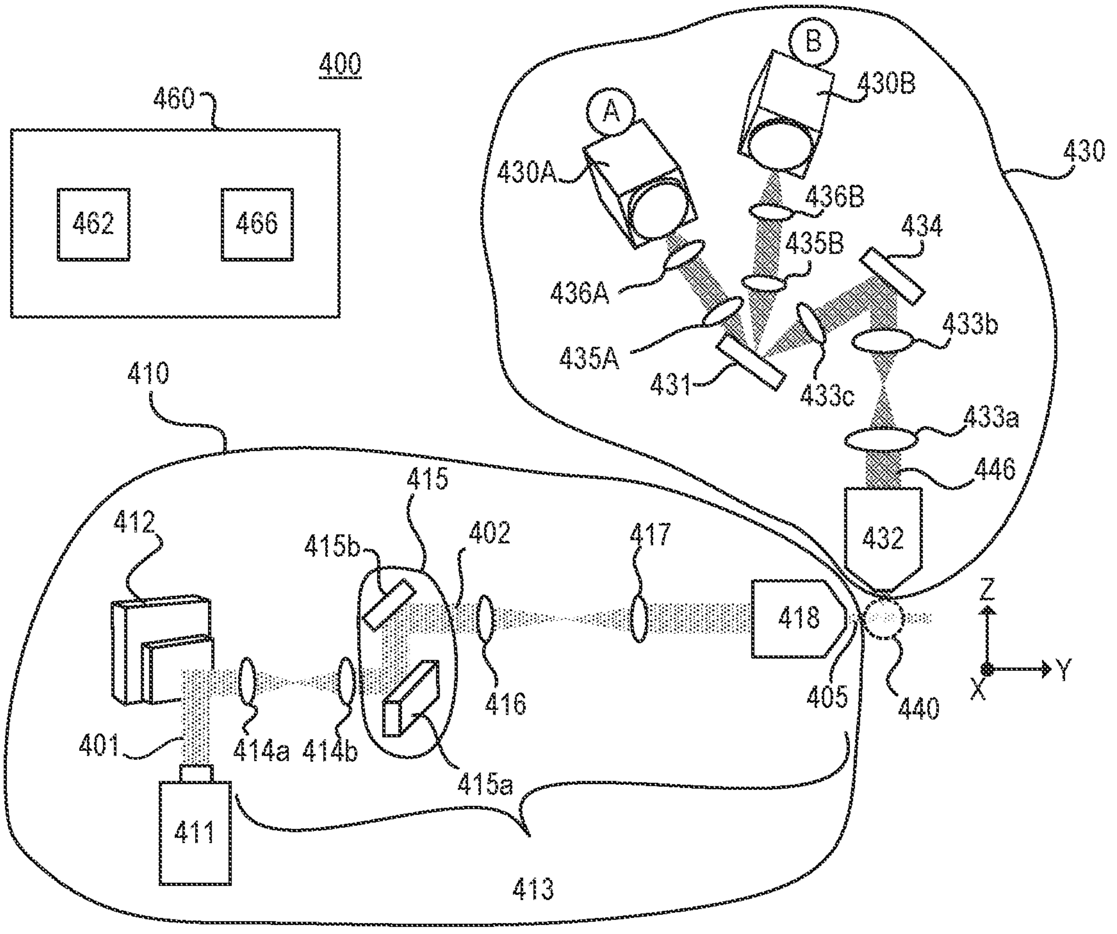
FIG. 4A is a schematic diagram of an implementation of the microscope system of FIG. 1 showing details about the illumination subsystem and the detection subsystem.
Figure 4B:
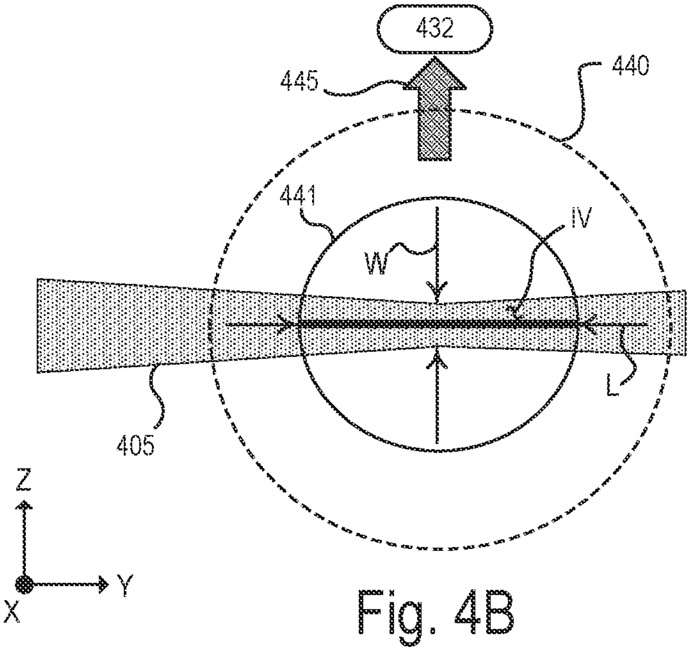
FIG. 4B is a schematic illustration of a specimen region at which a specimen is placed in the microscope system of FIG. 4A.

Referring to FIGS. 4A and 4B, an implementation 400 of the microscope system 100 is shown. The microscope system 400 includes an implementation 410 of the illumination subsystem 110 and an implementation 430 of the detection subsystem 130 arranged relative to a specimen region 440.

The illumination subsystem 410 includes a light source 411 that outputs a light beam 401; a spatial adjustment apparatus 412; and a set of optical components 413 between the spatial adjustment apparatus 412 and the specimen region 440. The optical components 413 modify properties such as direction, size, geometry, etc. of the light beam 401 to produce the light sheet 405 that is directed to a specimen 441 in the specimen region 440. The light sheet 405 produced within the illumination subsystem 410 can be produced by scanning an output of the light source 411, as will be discussed below.

The light source 411 can be a laser. In one type of imaging application, a single pulsed Ti:Sapphire laser can be the light source 411. In this case, the wavelength of the light can be adjusted to any value between 690 and 1080 nm. In another type of imaging application, the light source can be made up of one or more laser diodes and/or diode pumped solid state (DPSS) lasers, each producing a laser beam. The laser beams can be combined on the same optical axis using dichroic mirrors, thus effectively turning the entire unit into something that appears to be a single light source. The laser is controllable by the control system 360.

For example, the light source 411 can include one or more solid-state lasers (such as diode-pumped solid-state lasers) that operate at a plurality of wavelengths to provide for flexibility. In one example, the light source 411 includes a SOLE® Laser Light Engine produced by Omicron-Laserage Laserprodukte GmbH of Rodgau-Dudenhofen, Germany. Details on such lights sources can be found at their website at http://www.omicron-laser.de/. In these Light Engines, a plurality of outputs from internal and individual lasers operating at distinct wavelengths can be combined to form a single output. Outputs from the SOLE® Laser Light Engines can be directed through one or more fiber optics, depending on the application. The light source is connected to components within the actuation apparatus 362 to enable the control of the active laser lines and their respective laser power.

The output from the light source 411 can be controlled using an optical shutter, which controls the timing of the light sheet 405 that reaches the specimen 441 in the specimen region 440 (see also FIG. 4B). In some implementations, the optical shutter is a Uniblitz laser shutter (such as Uniblitz LS6ZM2-100 laser shutters or Uniblitz VS14S2ZM1-100 laser shutters). These optical shutters are able to block light that is directed through an aperture, and the blocking of the light can be synchronized, asychronized, or controlled depending on the application. A driver or actuator operates the laser shutter under control from the actuation apparatus 362. The actuator can be, for example, a Uniblitz VMM-D3 three-channel driver. In other implementations, the output from the light source 411 can be controlled using the operation hardware interface of the controller within the light source 411 to thereby control the on/off of the light source 411 through a digital modulation port via electrical modulation input signals.

Other types of light sources are possible, and the constraints on the selection of the light source include desired wavelength or wavelengths (which can be selected or modified to excite the fluorophores within the specimen 441), desired power, and desired beam quality.

The light beam 401 that is output from the light source 411 is directed to the spatial adjustment apparatus 412, which operates in one of a plurality of modes, and thus the spatial status (for example, either A or B) of the light sheet 405 is selected by interacting the light beam 401 with the spatial adjustment apparatus 412. From the spatial adjustment apparatus 412, the light beam 401 is directed through the optical components 413, which are driven by respective actuator systems that are connected to the actuation apparatus 362. In general, the optical components 413 can include, for example, mirrors, lenses, and objectives, optomechanical components (such as objectives) and electro-optical components.

The light beam 401 exiting the spatial adjustment apparatus 412 is directed through a pair of lenses 414*a*, 414*b* and then to an optical scanner device 415, which deflects the light beam 401 along the X axis (of the specimen region 440) to form a pre-cursor light sheet 402. The light sheet 402 is directed toward an f-theta lens 416, a tube lens 417, and an illumination objective 418. The optical scanner device 415 deflects the incident light beam 401 to produce an angular range that defines the height of the light sheet 405 along the X axis in the specimen region 440. And, the angle of the light sheet 402 that exits the optical scanner device 415 is converted into a displacement along the X axis or direction by the f-theta lens 416 because the optical scanner device 415 is positioned to be located at the focal plane of the f-theta lens 416. The pair of the tube lens 417 and the illumination objective 418 focuses the light sheet 402 output from the f-theta lens 416 into the microscopic light sheet 405 at the specimen region 440. The illumination objective 418 can be a relatively long working distance air objective. The illumination objective 418 can be a microscope objective that includes a single lens, or a combination of lenses and other optical elements.

In this description, the optical scanner device 415 deflects the light beam 401 along the X axis; however, it is possible that the light beam 401 can be deflected along another axis, depending on the application. For example, when performing volumetric imaging without moving the specimen 441, the light beam 401 can be deflected along the Z axis (of the specimen region 440) too. Moreover, it is possible to deflect or move the light beam 401 along the Z axis to align the light sheet 405 with another light sheet (in another implementation discussed below with reference to FIG. 8).

The optical scanner device 415 can be formed by one or more moveable mirrors 415*a*, 415*b*. The mirrors 415*a*, 415*b* can be mounted on a tip/tilt stage that is moveable under control of an actuator such as a piezoelectric driver, or they can be integrated within an actuator system such as the S-334 miniature piezo tip/tilt mirror by Physik Instrumente (PI), which includes the mirror. As another implementation, the mirrors 415*a*, 415*b* can be controlled using galvanometer scanners, such as the model 6215HSM40B from Cambridge Technology. Combining two scanners in an XY scan head provides the same angular degrees of freedom as a tip/tilt mirror assembly, but can be faster. The piezoelectric driver can be connected to a piezo driver module and a piezo servo module, which are within the actuation apparatus 362. For example, the PI S-334 can be connected to a PI E-503 piezo amplifier module that includes amplifiers that output current to the piezoelectric actuator to control the movement of the mirror 415*a* and to a PI E-509 piezo servo module. All of the modules for controlling the mirrors 415*a*, 415*b* can be housed within a sub-control module within the actuation apparatus 362.

The f-theta lens 416 converts the tilting movement of the scan mirror 415*a* into a displacement of the light beam 401 along the X axis. The tube lens 417 and the illumination objective 418 focus the light sheet 405 into the specimen 441 in the specimen region 440. The specimen region 440 is aligned with the detection subsystem 430 along the Z axis in this example. The f-theta lens 416 can be, for example, a color-corrected lens such as part S4LFT4375 from Sill Optics, which operates for light having a wavelength between 450 nm and 650 nm. The tube lens 417 and the illumination objective 418 can be purchased off the shelf from suppliers such as Carl Zeiss, Nikon, or Olympus. In one example, the tube lens 417 is an Olympus U-TLU-1-2 camera tube lens and the illumination objective 418 is an Olympus XLFLUOR 4x/340/0.28 objective mounted on a piezoelectric positioner that is controlled by electronics within the actuation apparatus 362. For example, the illumination objective 418 can be mounted to a long-travel scanner such as the P-725 PIFOC produced by Physik Instrumente, which is controlled by an amplifier/servo controller, such as the E-665 produced by Physik Instrumente, within the actuation apparatus 362.

Additionally, while not shown, the light beam 401 that is output from the light source 411 can be directed through respective optical filters, which can be mounted on a compact illumination filter wheel with controller (such as a DC servo controller made by Ludl Electronics Products Ltd. of Hawthorne, NY).

The detection subsystem 430 includes a detection objective 432 that collects the fluorescence light 445 (FIG. 4B) emitted from the specimen 441 (placed in the specimen region 440). The collected fluorescence light 446 (FIG. 4A) can also pass through a filter (not shown), which rejects light of wavelengths outside a wavelength band centered around the wavelength of the fluorescence light to be detected. The filter can be mounted on a filter wheel (not shown) with other filters, so that the wavelength of rejected light could be changed by selecting a different filter on the wheel by merely rotating the wheel into a new position. Light from the filter is directed through lenses 433*a*, 433*b*, a mirror 434, and lens 433*c*, which in combination, focus the light onto a beam steering device 431. The light from the beam steering device 431 is then directed along either an A path or a B path, depending on the spatial status of the light sheet (and the operating mode of the spatial adjustment apparatus within the illumination subsystem 410). The A path includes a focus adjustment apparatus A made up of lenses 435A, 436A, which are configured to independently adjust a focus of the light onto a sensor of the imaging device 430A. The B path includes a focus adjustment apparatus B made up of lenses 435B, 436B, which are configured to independently adjust a focus of the light onto a sensor of the imaging device 430B. The lenses 435, 436 can be tube lenses.

The detection objective 432 can be a microscope objective that includes a single lens, or a combination of lenses and other optical elements. In some implementations, the detection objective 432 can be a high numerical aperture water-dipping objective. For example, the objective 432 can be purchased from suppliers such as Carl Zeiss, Nikon, or Olympus. The detection objective 432 can be mounted or attached to a scanner (not shown), which is connected to and controlled by the connector blocks within the actuation apparatus 362. For example, the detection objective scanner can be a piezo-actuated scanner (a nanopositioner) such as the PIFOC® PI P-725 PIFOC long-travel objective scanner produced by Physik Instrumente (PI) GmbH & Co. KG of Germany.

The filter wheel at the output of the detection objective 432 can be purchased from Ludl Electronic Products Ltd. For example, the filter wheel can be the 96A354 6-slot filter wheel produced by Ludl. The filter wheel is operated by one or more servo controllers, which are connected to connector blocks within the actuation apparatus 362.

The tube lenses 435, 436 can be purchased from suppliers such as Carl Zeiss, Nikon, or Olympus, and the cameras within respective imaging devices 430A, 430B can be scientific CMOS (complementary metal oxide semiconductor) image sensors (sCMOS sensors). The sCMOS sensors can be purchased from Andor Technology plc. or from PCO-TECH Inc. (formerly The Cooke Corporation). Or, the sCMOS sensors can be the Orca Flash 4.0 sCMOS sensor from Hamamatsu. The cameras are connected to full-configuration frame grabbers in the computational apparatus 366 by a pair of standard data transfer cables, such as Camera Link® cables, that are a part of the actuation apparatus 362.

Components of the microscope system 400 communicate with a control system 460 (which is an implementation of the control system 360), which includes an actuation apparatus 462 and a computational apparatus 466. For example, the control system 460 can send instructions to the light source 411, the spatial adjustment apparatus 412, and the beam steering device 431 to control operation of these components. The control system 460 can send instructions to actuators associated with optical components to control position and angle of such optical components. The control system 460 can receive information from various components of the microscope system 400 as well.

Figure 6B:
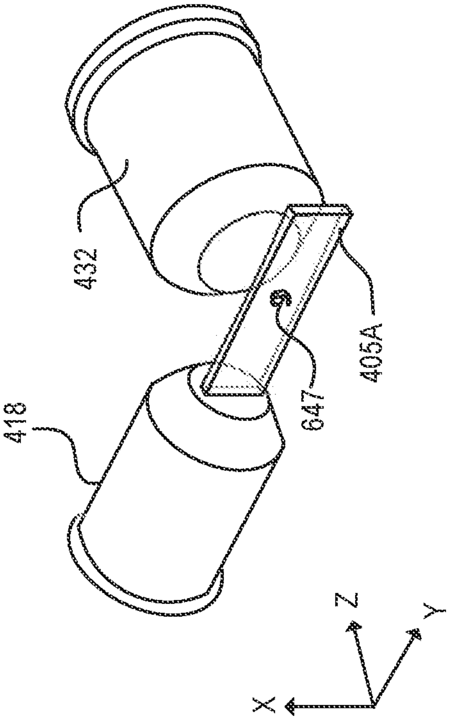
FIG. 6B is a perspective view of a specimen region showing how the zebrafish embryo of FIG. 6A is placed in the specimen region, the light sheet having a first status that corresponds to a larger field of view and the arrangement of the illumination objective and the detection objective.
Figure 6C:
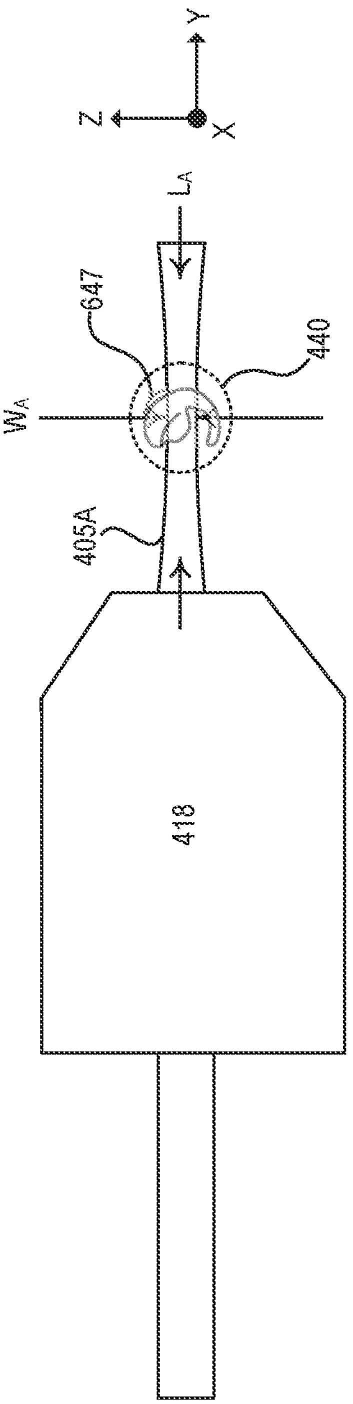
FIG. 6C is a plan view of the specimen region of FIG. 6B.

As shown in FIG. 4B, the light sheet 405 optically interacts with the specimen 441 along an image volume IV that extends along the XY plane. The image volume IV is determined by the spatial status of the light sheet 405. The light sheet 405 is configured so that its minimal thickness or width W (as taken along the Z axis) is within the image volume IV and the field of view of the imaging devices 430A, 430B within the detection subsystem 430. As discussed below with reference to FIGS. 6A-6C and 7A-7C, there is a tradeoff between the minimal thickness W of the light sheet 405 and the uniformity of the light sheet 405 thickness across the image volume IV. Thus, if the minimal thickness W is reduced, then the light sheet 405 becomes thicker at the edges of the image volume IV (this is shown in FIGS. 7B and 7C). The thickness W of the light sheet 405 is inversely proportional to the numerical aperture of the illumination subsystem 410; and the useable length L of the light sheet 405, that is, the length L over which the thickness W is sufficiently uniform, is inversely proportional to the square of the numerical aperture. The thickness W of the light sheet 405 can be estimated using any suitable metric, such as the full width of the light sheet 405 along the Z axis taken at half its maximum intensity (FWHM). In general, the thickness W of the light sheet 405 (as taken along the Z axis) should be less than the size (and the thickness) of the specimen 441 to maintain image contrast and reduce out of focus background light. In particular, the thickness W of the light sheet 405 should be substantially less than the size of the specimen 441 in order to improve the image contrast over a conventional illumination approach in which the entire specimen 441 is illuminated.

Another important consideration for setting the minimal thickness W of the light sheet 405 or for defining a realistic image volume IV, is the size of the structure within the specimen 441 that needs to be resolved by the microscope system 400. As discussed above, the microscope system 400 is configured to enable the imaging of different structures of different sizes within the specimen 441. Thus, the microscope system 400 is configured to provide varying minimal thicknesses W and lengths L, depending on the operating mode of the spatial adjustment apparatus 412, the spatial status of the light sheet 405, and the field of view (A or B) of the imaging device (either 430A or 430B). For example, in some operating modes of the spatial adjustment apparatus 412, the microscope system 400 can be set up to image cell nuclei, which are about 4-5 μm in size (taken along a straight line across the nucleus) in Drosophila, and around 7-8 μm in size in a zebrafish at the early developmental stages in which the microscope system 400 can be used.

The images of the specimen 441 are recorded in steps taken along the Z axis (by either translating the specimen 441, the light sheet 405, or both the specimen 441 and the light sheet 405 along the Z axis); and the size of the steps should be about the size of this minimal thickness W.

Figure 5A:
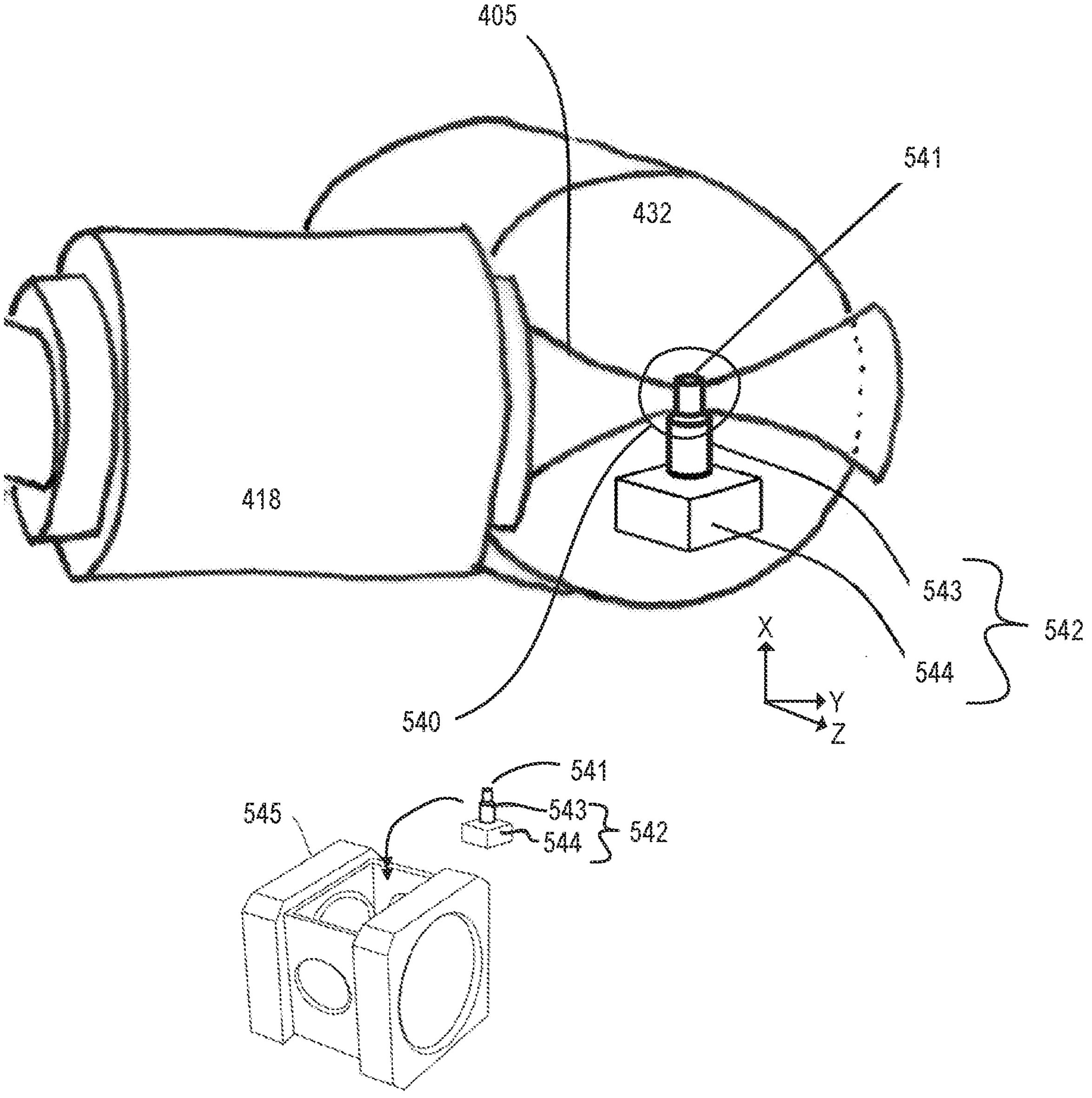
FIG. 5A is a perspective view of a specimen region showing how a specimen is held in the specimen region relative to an illumination objective and a detection objective as well as a chamber in which the specimen is placed, in which the illumination objective and the detection objective are arranged in a horizontal plane.

Next, a description of the specimen 441 and its associated optical, mechanical and electrical components within the specimen region 140 or 440 is provided with reference to FIG. 5A. The specimen 541 is attached to a specimen holder 542 that enables the specimen 541 to be optically accessible to the illumination subsystem 110, 310, 410 and the detection subsystem 130, 330, 430. The specimen 541 and the holder 542 can be placed within a hollow space defined by a specimen chamber 545. For example, the holder 542 can include a glass capillary 543 that is mounted to a solid base 544. The base 544 of the specimen holder 542 can be produced from medical-grade stainless steel. The holder 542 can be a custom water-sealed flexible specimen holder. The holder 542 is physically attached to a positioning system that provides a translation stage and a rotation stage, which is in communication with the control system 460 (and operates under the control of the actuation apparatus 462). The translation stage can be set up to translate the holder 542 and thus the specimen 541 can be translated along three orthogonal directions, for example, along the X, Y, and Z axes. The rotation stage can be set up to rotate the holder 542 and thus the specimen 541 can be rotated about the X, Y, or Z axis. The positioning system can be inside of or external to the specimen chamber 545.

The objective 418 in the illumination subsystem 410 and the objective 432 in the detection subsystem 430 are directed at the center region of the chamber 545, at which the specimen 541 is positioned and located. In this implementation, the axis (which is the Y axis) of the objective 418 within the illumination subsystem 410 is oriented perpendicularly to the axis (which is the Z axis) of the objective 432 of the detection subsystem 430.

In some implementations, the positioning system for the holder 542 (and thus the specimen 541) can be a high-performance stepper and servo motion control such as the NI PXI-7354 motion controller produced by National Instruments. This control can be connected to an interface within the actuation apparatus 362 such as a C-809.40 4-channel servo-amplifier/motion I/O interface produced by Physik Instrumente (PI) GmbH & Co. KG.

The chamber 545 has an internal hollow space having a volume that is large enough to accommodate the specimen 541 and the holder 542; for example, a chamber with full optical access from all sides enables simultaneous light sheet illumination and fluorescence detection with four objectives (such as shown in and discussed with reference to FIG. 8). Full optical access and improved specimen positioning control (three-dimensional translation and one-dimensional rotation) can be realized by splitting the subsystems of the microscope system 100 into two horizontal layers. For example, all optical systems of the illumination subsystem 110, 310, 410 and of the detection subsystem 130, 330, 430 could be located in an upper layer, whereas the specimen positioning system could be located underneath the specimen chamber 545 on a lower optical table. The specimen positioning system can be configured in an upright position (for example, along the X axis), thus permitting the use of exceptionally soft (0.4%) agarose gels for specimen embedding within the glass capillary 543 of the holder 542. Mechanical stability during imaging is largely provided by the solid base 644 of the holder 642 on which the capillary is mounted.

Figure 8:
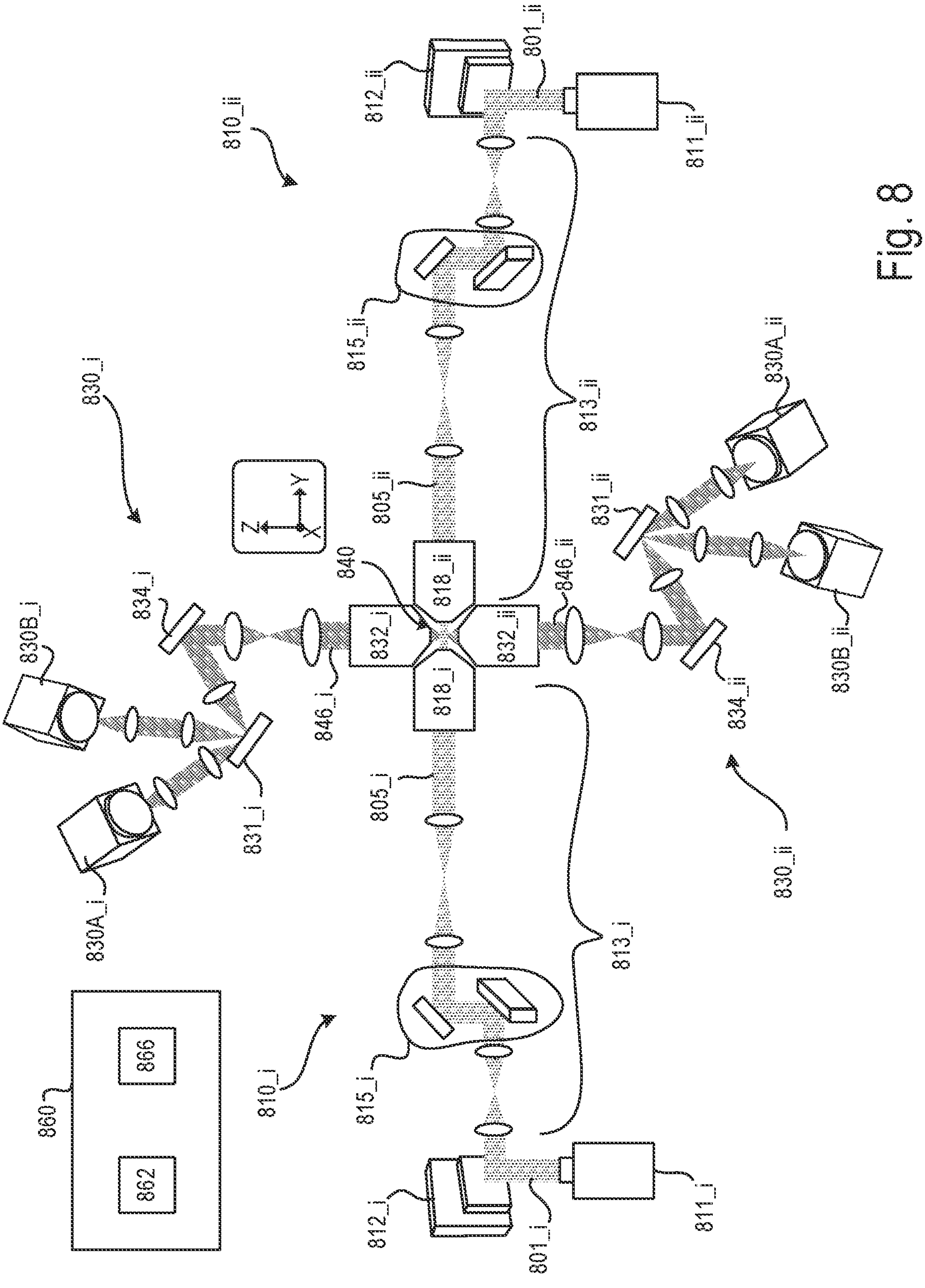
FIG. 8 is a schematic diagram of an implementation of the microscope system of FIG. 1, in which the microscope system includes two illumination subsystems and two detection subsystems, including details about the illumination subsystems and the detection subsystems.

The chamber 545 can be custom designed and built to provide enough views for the illumination and detection; in this example, two views and in the example of FIG. 8, four views. The chamber 545 can include a perfusion system. The specimen chamber 645 houses the specimen holder 542 and the specimen 541, and it can also house a multi-stage adapter module for connecting the specimen holder 542 to the specimen positioning system and the custom perfusion system. Using the positioning system, the holder 542 can be translated in three dimensions and rotated around its main axis (the X axis) without breaking the water seal. The chamber 545 is open at one side to accommodate a water-dipping detection objective 432 (or is open to two opposite sides to accommodate the water-dipping detection objectives of FIG. 8) and contains a window with a coverslip on the orthogonal side for laser light sheet illumination from the illumination objective 418 (or contains two opposing windows for laser light sheet illumination from two illumination subsystems as shown in FIG. 8). The top of the chamber 545 is open for mechanical or optical access and allows background illumination with a cold light source.

As discussed above, the XY plane can be vertically arranged, that is, aligned with the gravitational pull of the earth. In these implementations, the specimen 541 can be vertically arranged as well. This is shown in FIG. 5A.

Figure 5B:
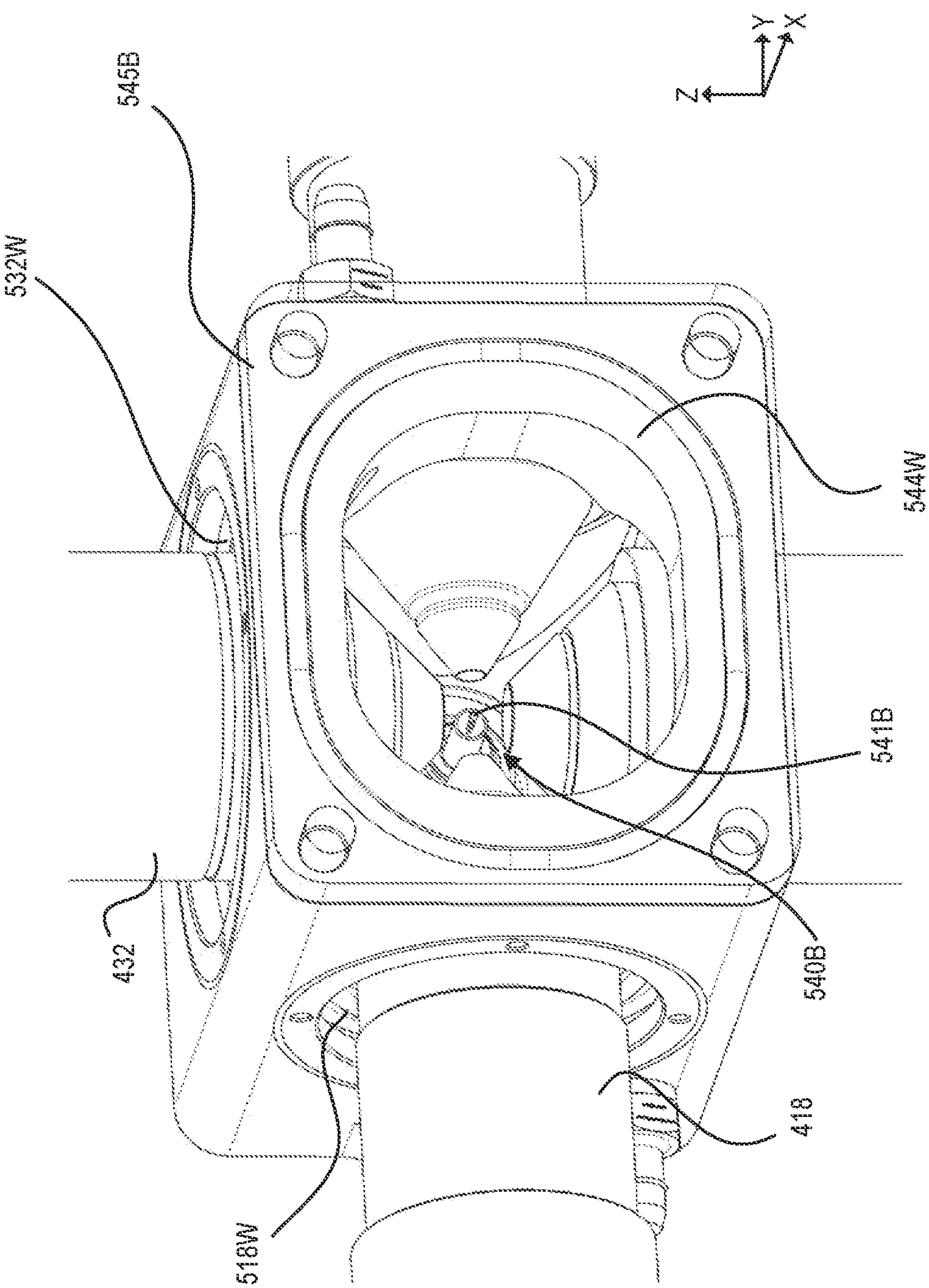
FIGS. 5B and 5C are perspective views of a specimen region and a chamber in which the specimen is held in the specimen region relative to an illumination objective and a detective objective, where the illumination objective and detection objective are arranged in a vertical plane.
Figure 5C:
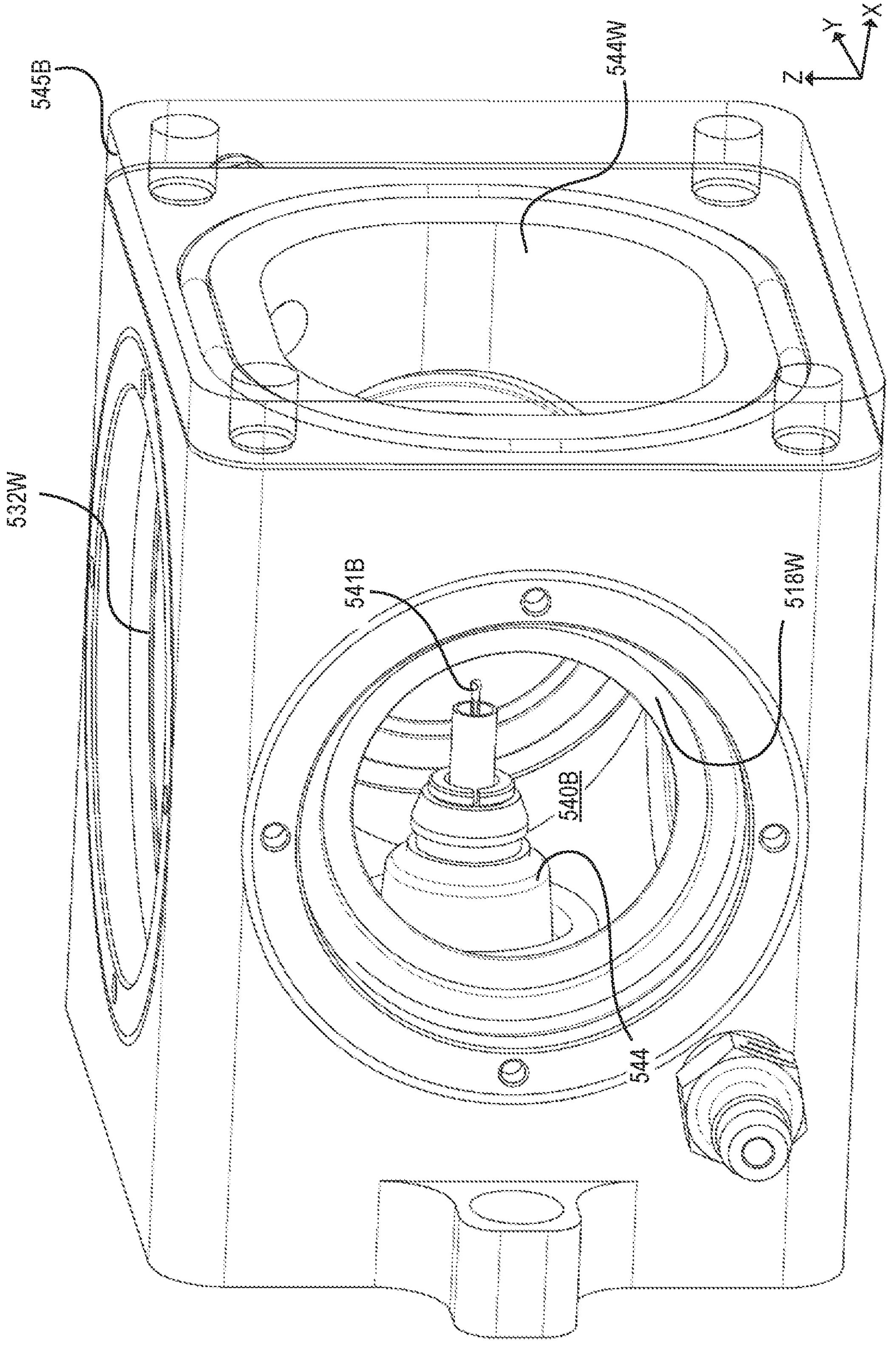

Referring to FIGS. 5B and 5C, in other implementations, the XY plane can be horizontally arranged, that is, perpendicular with the earth's gravitational pull. In these implementations, a specimen 541B can be horizontally arranged as well, which can be a more natural position for a live biological specimen 541B. In these implementations, the chamber 545 can be designed as a chamber 545B. The chamber 545B includes a transparent window 532W arranged along the Z axis to permit an optical path for fluorescence from the specimen region 540B through the detection objective 432 and a transparent window 518W arranged along the Y axis to enable an optical path for the light sheet 405 to pass through illumination objective 418 and to the specimen region 540B. The chamber 545B includes windows at respective opposite sides to the windows 532W, 518W, such windows can be transparent if the chamber 545B is used in the microscope system 800 to enable optical paths for the opposing fluorescence and light sheet. If the objectives 418, 432 are water dipped, then the chamber 545B is hermetically sealed at all sides, including at the other two sides that are arranged along the X axis. Specifically, a plate or window 544W can be arranged opposite to the specimen 541B and the specimen holder base 544 can be sealed at the other side of the chamber 545B along the-X axis.

Figure 6A:
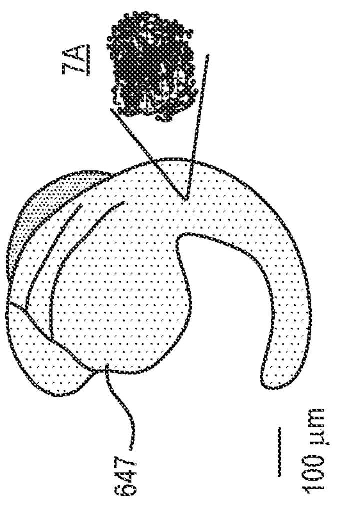
FIG. 6A is a perspective view of a specimen that is an embryo of a zebrafish.
Figure 7B:
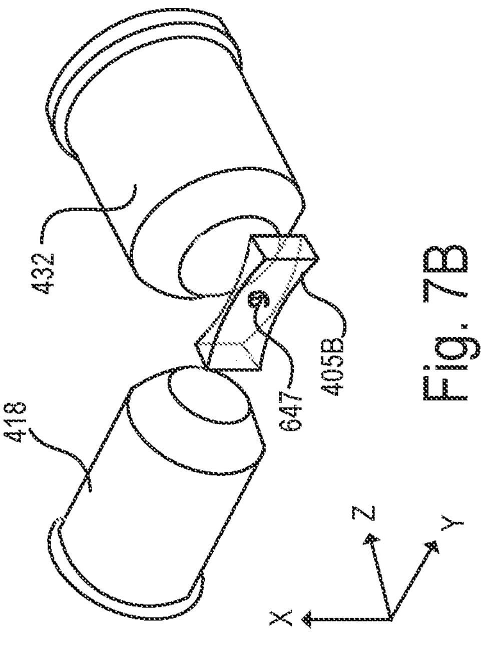
FIG. 7B is a perspective view of a specimen region showing how the zebrafish embryo of FIG. 6A is placed in the specimen region, the light sheet having a second status that corresponds to a smaller field of view determined based on the image of the zebrafish embryo at the larger field of view from FIG. 6B, and the arrangement of the illumination objective and the detection objective.

Referring to FIG. 6A, in an example, an embryo 647 of a zebrafish specimen placed at the specimen region 440 is imaged by the microscope system 400. In this example, the embryo 647 is on the scale of a few hundred μm (for example, 600-700 μm). On the other hand, and with reference to FIG. 7A, the microscope system 400 is also configured to image the activity of individual cells, including cell division 747 within the embryo 647. The scale and field of view to image the entire embryo 647 is much larger than the scale and field of view to image just cell division 747 within that embryo 647.

In FIG. 6A, the microscope system 400 is configured to operate with spatial status A, which corresponds to a relatively (that is, relative to that of the spatial status B and imaging device 430B) larger scale or field of view to be imaged at the imaging device 430A. In this case, with reference to FIGS. 6B and 6C, the light sheet is configured with a spatial status A in which a width $W_A$ (which is a beam waist) and an interacting length $L_A$ of the light sheet 405A are relatively larger. The interacting length $L_A$ of the light sheet 405A is the distance along the Y axis that can be imaged by the imaging device 430A. The spatial status A of the light sheet 405A is such that the light sheet 405A is less converging and diverging in the specimen region 440 and this basically means that the light sheet 405A has a larger volume for interacting with the embryo 647.

Figure 7A:
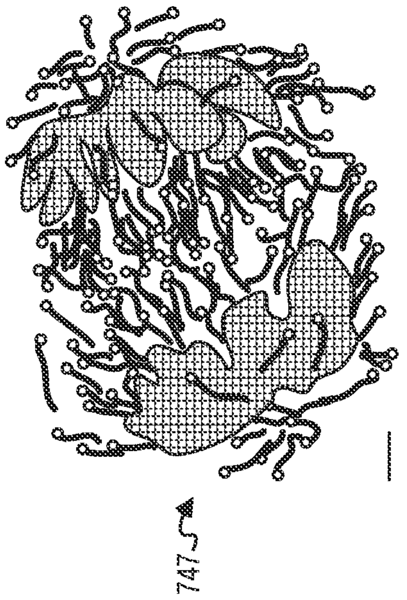
FIG. 7A is a perspective view of a cluster of individual cells of the zebrafish embryo of FIG. 6A.
Figure 7C:
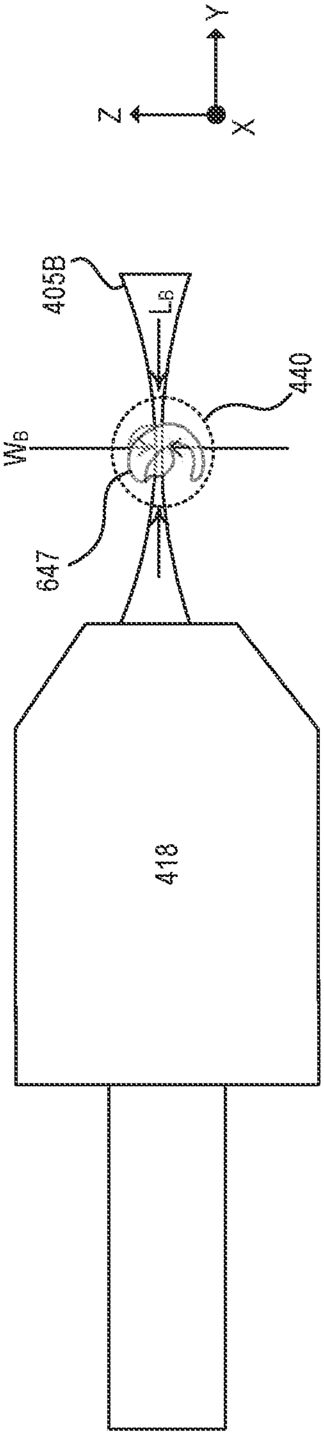
FIG. 7C is a plan view of the specimen region of FIG. 7B.

In FIG. 7A, the microscope system 400 is configured to operate with spatial status B, which corresponds to a relatively (that is, relative to that of the spatial status A and imaging device 430A) smaller scale or field of view to be imaged at the imaging device 430B. In this case, with reference to FIGS. 7B and 7C, the light sheet is configured with a spatial status B in which a width $W_B$ (which is a beam waist) and an interacting length $L_B$ of the light sheet 405B are relatively larger. The interacting length $L_B$ of the light sheet 405B is the distance along the Y axis that can be imaged by the imaging device 430B. The spatial status B of the light sheet 405B is such that the light sheet 405B is more converging and diverging in the specimen region 440 and this basically means that the light sheet 405B has a smaller volume for interacting with the embryo 647. The volume of the light sheet 405B within the specimen region 440 is small enough and the field of view is small enough to image the cell division 747 within the embryo 647.

Referring to FIG. 8, an implementation 800 of the microscope system 100 includes two opposing illumination subsystems 810_i, 810_ii respectively producing light sheets 805_i, 805_ii that are directed to a specimen region 840, and two opposing detection subsystems 830_i, 830_ii arranged relative to the specimen region 840. A close-up of the specimen region 840 is shown in FIG. 9, which is exaggerated to more clearly show the interactions between the light sheets 805_i, 805_ii, and a specimen 841 in the specimen region 840.

The first illumination subsystem 810_i is designed like the illumination subsystem 410 so that the light sheet 805_i is directed along the Y axis within the specimen region 840. The second illumination subsystem 810_ii is a mirror image of the illumination subsystem 410 such that the light sheet 805_ii is directed along the -Y axis within the specimen region 840. Thus, the first and second illumination subsystems 810_i, 810_ii include respective light sources 811_i, 811_ii outputting respective light beams 801_i, 801_ii toward respective spatial adjustment apparatuses 812_i, 812_ii. The light beams output from the spatial adjustment apparatuses 812_i, 812_ii are directed through respective optical components 813_i, 813_ii. The optical components 813_i, 813_ii include respective optical scanner devices 815_i, 815_ii to produce respective light sheets 805_i, 805_ii, which are focused within the specimen region 840 by way of respective illumination objectives 818_i, 818_ii.

Detection objectives 832_i, 832_ii in respective detection subsystems 830_i, 830_ii collect the fluorescence light 846_i, 846_ii made up of the photons emitted from the specimen 841. The light 846_i, 846_ii is respectively steered to either the A path (and to respective imaging device 830A_i, 830A_ii) or the B path (and to respective imaging device 830B_i, 830B_ii) by way of respective interaction with the beam steering device 831_i, 831_ii.

Figure 9:
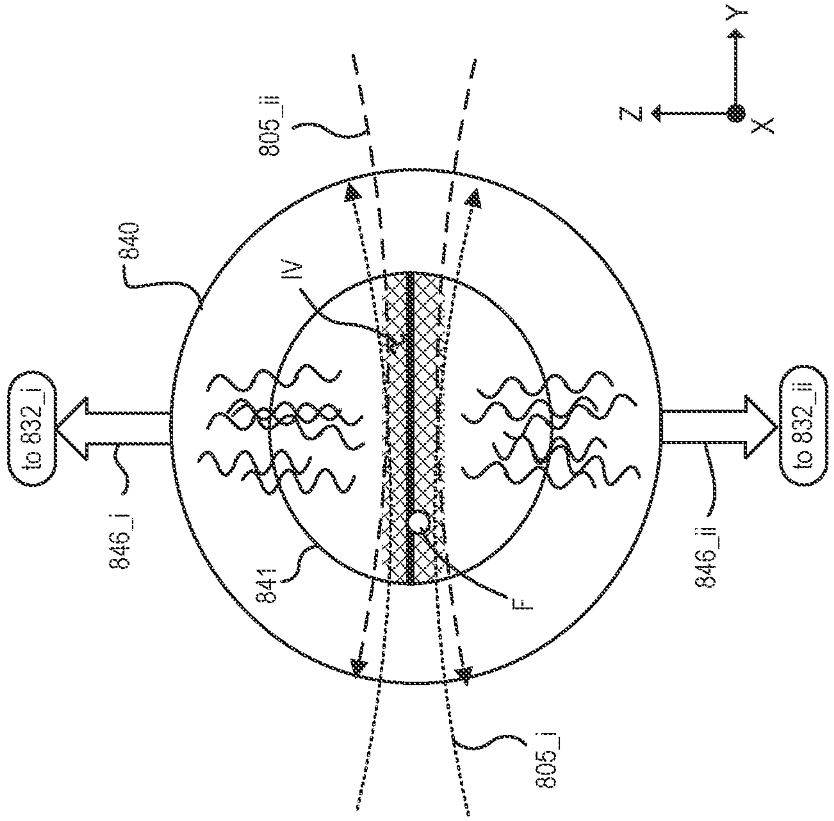
FIG. 9 is a schematic illustration of a specimen region at which a specimen is placed in the microscope system of FIG. 8.

As shown in FIG. 9, the light sheets 805_i, 805_ii spatially overlap and temporally overlap each other within the specimen 841 along an image volume IV that extends along the Y-X plane. The light sheets 805_i, 805_ii optically interact with the specimen 841 within the image volume IV. The image volume IV is determined by the spatial statuses of the light sheets 805_i, 805_ii and how much the light sheets 805_i, 805_ii overlap with each other. The temporal overlap is within a time shift or difference that is less than a resolution time that corresponds to the spatial resolution limit of the microscope system 800. In particular, this means the light sheets 805_i, 805_ii overlap spatially within the image volume IV of the specimen 841 at the same time or staggered in time by the time difference that is so small that any displacement of a tracked feature F within the specimen 841 during the time difference is significantly less than (for example, an order of magnitude below) a resolution limit of the microscope system 800, where the resolution limit is a time that corresponds to a spatial resolution limit of the microscope system 800.

Each light sheet 805_i, 805_ii is generated with a respective optical scanner 815_i, 815_ii that rapidly moves a respective thin (for example, a μm-thick) beam of light 801_i, 801_ii along the illumination axis (the X axis) to form a respective light beam that extends generally along or parallel with a plane to form the respective light sheet 805_i, 805_ii. In this example, the light sheets 805_i, 805_ii illuminate the specimen 841 along the Y axis on opposite sides of the specimen 841. Rapid scanning of a thin volume within the specimen 841 and fluorescence detection at a right angle (in this example, along the Z axis) to the illumination axis Y provides an optically sectioned image of the specimen 841. The light sheets 805_i, 805_ii excite fluorophores within the specimen 841 into higher energy levels, which then results in the subsequent emission of a fluorescence photon P, and the collection of fluorescence photons P are detected by the imaging device within the detection subsystems 830_i, 830_ii (along the Z axis).

The fluorophores that are excited in the specimen 840 can be labels that are attached to the cells, such as, for example, genetically-encoded fluorescent proteins such as GFP or dyes such as Alexa-488. However, the fluorophores can, in some implementations that use second-harmonic generation or third-harmonic generation, be actual or native proteins within the cells that emit light of specific wavelengths upon exposure with the light sheets 805_i, 805_ii.

The term "spatial overlap" of the light sheets 805_i, 805_ii could mean that the light sheets 805_i, 805_ii are overlaid geometrically within the specimen 841. The term "spatial overlap" can also encompass having the light sheets 805_i, 805_ii both arrive geometrically within the field of view of the imaging devices 830A_i, 830B_i; 830A_ii, 830B_ii within the respective detection subsystems 830_i, 830_ii and within the specimen 841. For example, to efficiently trigger two-photon excitation, each light sheet 805_i, 805_ii could cover only a part of (for example, one half) of the field of view of the imaging devices within the detection subsystems 830_i, 830_ii (so that each light sheet is centered in the respective half of the field of view) so that the use of both of the light sheets 805_i, 805_ii leads to the full field of view being visible.

The light sheet 805_i, 805_ii is configured so that its minimal thickness or width W (as taken along the Z axis) is within the image volume IV and the field of view of the imaging devices 830A_i, 830B_i; 830A_ii, 830B_ii within the respective detection subsystems 830_i, 830_ii. When two light sheets 805_i, 805_ii are directed toward the specimen 841, then the minimal thickness (the width W) of the respective light sheet 805_i, 805_ii should overlap with the image volume IV. It can be set up so that the minimal thickness W of the light sheet 805_i is offset from the minimal thickness W of the light sheet 805_ii. This set up can provide improved or superior spatial resolution (for both one-photon and two-photon excitation schemes) and improved or superior signal rates (for two-photon excitation schemes).

As discussed above with reference to FIGS. 6A-6C and 7A-7C, there is a tradeoff between the minimal thickness of the light sheet 805_i, 805_ii and the uniformity of the light sheet 805_i, 805_ii thickness across the image volume IV. Thus, if the minimal thickness W is reduced, then the light sheet 805_i, 805_ii becomes thicker at the edges of the image volume IV (this is shown in FIGS. 7B and 7C). The thickness W of the light sheet 805_i, 805_ii is proportional to the numerical aperture of the respective illumination subsystem 810_i, 810_ii; and the useable length L of the light sheet 805_i, 805_ii, that is, the length L over which the thickness W is sufficiently uniform, is inversely proportional to the square of the numerical aperture. The thickness W of the light sheet 805_i, 805_ii can be estimated using any suitable metric, such as the full width of the light sheet 805_i, 805_ii along the Z axis taken at half its maximum intensity (FWHM).

For example, a light sheet 805_i, 805_ii having a minimal thickness of 4 μm (using a suitable metric such as the FWHM) is a good match for an image volume IV that has a field of view of 250 μm (which means that it is 250 μm long (as taken along the Y axis)). A good match means that it provides a good average resolution across the field of view. A thinner light sheet would improve resolution in the center (taken along the Y axis) but could degrade the resolution dramatically and unacceptably at the edges of the specimen 841, and possibly lead to worse average resolution across the field of view. A thicker light sheet would make the light sheet more uniform across the image volume IV (as shown in FIGS. 6B and 6C), but it would degrade the resolution across the entire image volume IV. As another example, a light sheet 805_i, 805_ii having a minimal thickness of 7 μm (using a suitable metric such as the FWHM) is a good match for an image volume IV that has a field of view of 700 μm (and thus it is 700 μm long (as taken along the Y axis)).

In general, the thickness W of the light sheet 805_i, 805_ii (as taken along the Z axis) should be less than the size (and the thickness) of the specimen 841 to maintain image contrast and reduce out of focus background light. In particular, the thickness W of the light sheet 805_i, 805_ii should be substantially less than the size of the specimen 841 in order to improve the image contrast over a conventional illumination approach in which the entire specimen 841 is illuminated.

Another important consideration for setting the minimal thickness W of the light sheet 805_i, 805_ii or for defining a realistic image volume IV, is the size of the structure within the specimen 841 that needs to be resolved by the microscope system 800. Often, the microscope system 800 is set up to image cell nuclei, which are about 4-5 μm in size (taken along a straight line across the nucleus) in Drosophila, and around 7-8 μm in size in a zebrafish at the early developmental stages in which the microscope system 100 can be used To achieve reasonably good spatial sampling and resolution, the light sheet 805_i, 805_ii should have a minimal thickness W that is not much thicker than half the cross-sectional size or length of these nuclei. Thus, for Drosophila, the minimal thickness W of the light sheet 805_i, 805_ii should be less than 2-3 μm while for the zebrafish, the minimal thickness W of the light sheet 805_i, 805_ii should be less than 3-4 μm. Moreover, the images of the specimen 841 should be recorded in steps taken along the Z axis (by either translating the specimen 841, the light sheets 805_i, 805_ii, or both the specimen 841 and the light sheets 805_i, 805_ii along the Z axis); and the size of the steps should be about the size of this minimal thickness.

Components of the microscope system 800 communicate with a control system 860 (which is an implementation of the control system 360), which includes an actuation apparatus 862 and a computational apparatus 866. The control system 860 is configured for operation with and on plural illumination subsystems and plural detection subsystems. For example, the control system 860 can send instructions to one or both of the light sources 811_i, 811_ii, one or both of the spatial adjustment apparatuses 812_i, 812_ii, and one or both of the beam steering device 831_i, 831_ii to control operation of these components. The control system 860 can send instructions to actuators associated with optical components to control position and angle of such optical components in the respective subsystems. The control system 860 can receive information from various components of the microscope system 800 as well.

Figure 10:
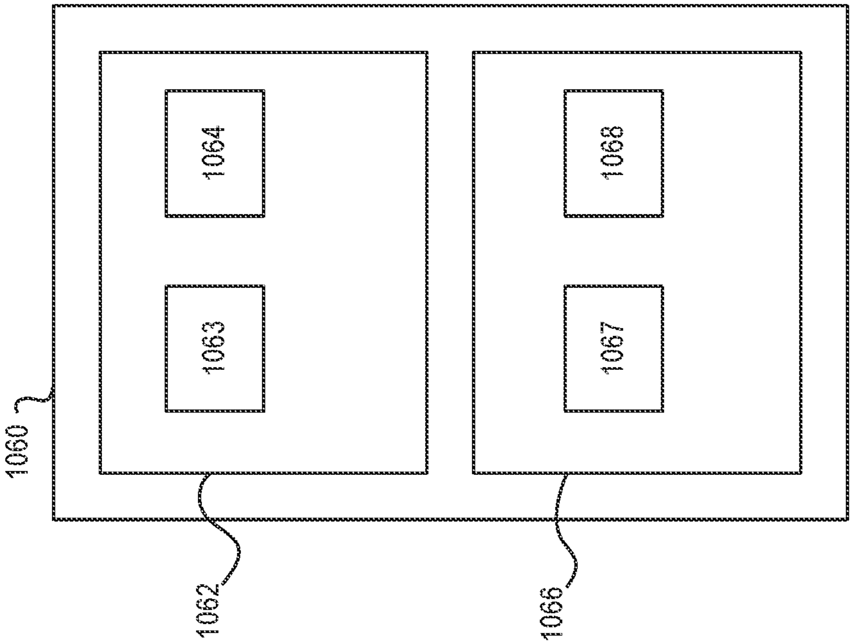
FIG. 10 is a block diagram of an implementation of a control system of any of the microscope systems of FIGS. 1, 3, 4A, and 8.

Referring to FIG. 10, an implementation 1060 of the control system 360 is shown. All optical and mechanical components (such as within the illumination subsystem 110, 310, 410, or 810_i/810_ii; the detection subsystems 130, 330, 430, or 830_i, 830_ii; or the specimen holder 542 and specimen chamber 545) of the microscope system 100, 300, 400, or 800 are operated and synchronized by the control system 1060. The actuation apparatus 1062 communicates with the computational apparatus 1066 to coordinate the image acquisition workflow and also to coordinate the switching between the operating modes of the spatial adjustment apparatus 112, 312, 412, 812_i/812_ii. All of the optical, mechanical, and electrical components within the microscope system 100, 300, 400, or 800 are connected to components within the control system 1060 to provide real-time control in each of the “arms” of the microscope system; with each arm being one of either the illumination subsystem 110 or the detection subsystem 130.

Relevant to the coordination of switching between the operating modes of the spatial adjustment apparatus 112, 312, 412, 812_i/812_ii, the actuation apparatus 1062 includes an illumination mode module 1063 configured to send a signal to the illumination subsystem 110, 310, 410, 810_i/810_ii to control operation of the spatial adjustment apparatus 112, 312, 412, 812_i, 812_ii. The actuation apparatus 1062 also includes a detection mode module 1064 configured to send a signal to the detection subsystem 130, 330, 430, 830_i/830_ii to control operation of the beam steering device 331, 431, 831_i/831_ii in coordination with the control of the spatial adjustment apparatus 112, 312, 412, 812_i, 812_ii. Thus, the detection mode module 1064 and the illumination mode module 1063 either communicate directly or receive instructions simultaneously from the computation apparatus 1066. Moreover, the computational apparatus 1066 includes an imaging module 1067 configured to analyze images from each imaging device 130A, 130B (or 330A, 330B; 430A, 430B; 830A_i, 830B_i; 830A_ii, 830B_ii) of the fluorescence and to form a three-dimensional image of the specimen 841 based on the analysis of these images.

The computational apparatus 1066 also include an analysis mode module 1068 configured to analyze the XY-plane image of the specimen (such as the embryo 647 or the specimen 841) and to determine whether to instruct the illumination mode module 1063 and the detection mode module 1064 based on the analysis of this XY-plane image. For example, the XY-plane image of the embryo 647 can be produced from the image output from the imaging device 430A, and it can provide a large field of view map of the embryo. In this case, the spatial adjustment apparatus 412 is operating in the spatial mode A, which produces the light sheet 405A with a larger volume for interacting with the embryo 647 (as shown in FIGS. 6A-6C). As another example, the XY-plane image of the specimen 841 can be produced from the images output from the imaging devices 830A_i and 830A_ii, and it can provide a large field of view map of the specimen 841. In this case, the spatial adjustment apparatus 812_i, 812_ii is operating in the spatial mode A, which produces a light sheet 805_i, 805_ii with a larger volume for interacting with the specimen 841. The analysis mode module 1068 can analyze this large field of view map to select and implement a second spatial status of the light sheet and instruct the illumination mode module 1063 to change operating mode.

In some implementations, the analysis mode module 1068 can determine a small field of view of the specimen (such as the embryo 647 or the specimen 841) to image with the other imaging device (such as the imaging device 430B in the microscope system 400 or the imaging devices 830B_i and 830B_ii in the microscope system 800) while the respective spatial adjustment apparatus 412 or 812_i, 812_ii is operating in spatial mode B.

In other implementations, the analysis mode module 1068 can select a pre-determined small field of view of the specimen to image with the other imaging device (such as the imaging device 430B in the microscope system 400 or the imaging devices 830B_i and 830B_ii in the microscope system 800). The small field of view is smaller than the large field of view and is contained within the large field of view. In particular, the analysis mode module 1068 can be configured to select and implement a second spatial status of the light sheet 405 by selecting a pre-determined spatial status associated with the first spatial status.

As mentioned above, in other implementations, the detection subsystem 130 includes more than two imaging devices 130A, 130B, 130C, . . . . In such implementations, the analysis mode module 1068 can select a plurality (for example, 3, 4, 5, etc.) of small fields of view based on the analysis of the field of view map.

In general, each of the actuation apparatus 1062 and the computational apparatus 1066 includes one or more of digital electronic circuitry, computer hardware, firmware, and software. Each of the actuation apparatus 1062 and the computational apparatus 1066 includes memory, which can be read-only memory and/or random-access memory. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Each of the actuation apparatus 1062 and the computational apparatus 1066 can also include one or more input devices (such as a keyboard, touch screen, microphone, mouse, hand-held input device, etc.) and one or more output devices (such as a speaker or a monitor).

Each of the actuation apparatus 1062 and the computational apparatus 1066 includes one or more programmable processors, and one or more computer program products tangibly embodied in a machine-readable storage device for execution by a programmable processor. The one or more programmable processors can each execute a program of instructions to perform desired functions by operating on input data and generating appropriate output. Generally, the processor receives instructions and data from memory. Any of the foregoing may be supplemented by, or incorporated in, specially designed ASICs (application-specific integrated circuits).

Each module 1063, 1064, 1067, 1068 includes a set of computer program products executed by one or more processors. Moreover, any of the modules 1063, 1064, 1067, 1068 can access data stored within the memory. Each module 1063, 1064, 1067, 1068 can be in communication with one or more other modules 1063, 1064, 1067, 1068 or other modules not described.

Although the control system 1060 is represented as a box (in which all of its components can be co-located), it is possible for the control system 1060 to be made up of components that are physically remote from each other. For example, the illumination mode module 1063 can be physically co-located with the illumination subsystem 110, 310, 410, 810_i/810_ii.

The control system 1060 can include other modules not shown in FIG. 10, for performing other computational tasks such as controlling hardware components within the microscope system 100, 300, 400, 800, managing and executing imaging workflow, and real-time image analysis that may be required to inform imaging workflow and control of the hardware components.

The computational apparatus 1066 can communicate with or include an image acquisition workstation that performs a registration of images, which is a process that aligns the images from the imaging devices 130A, 130B (or 330A, 330B; 430A, 430B; 830A_i, 830B_i/830A_ii, 830B_ii). In general, the image processing workstation performs a fusion of the images, which is a process of combining the registered images into a single representation or image. In particular, images are fused by combining the information content of the images into a single image. Details about fusion are discussed in detail in U.S. Pat. No. 9,404,869, the entire contents of which is incorporated herein by reference.

Figure 11:
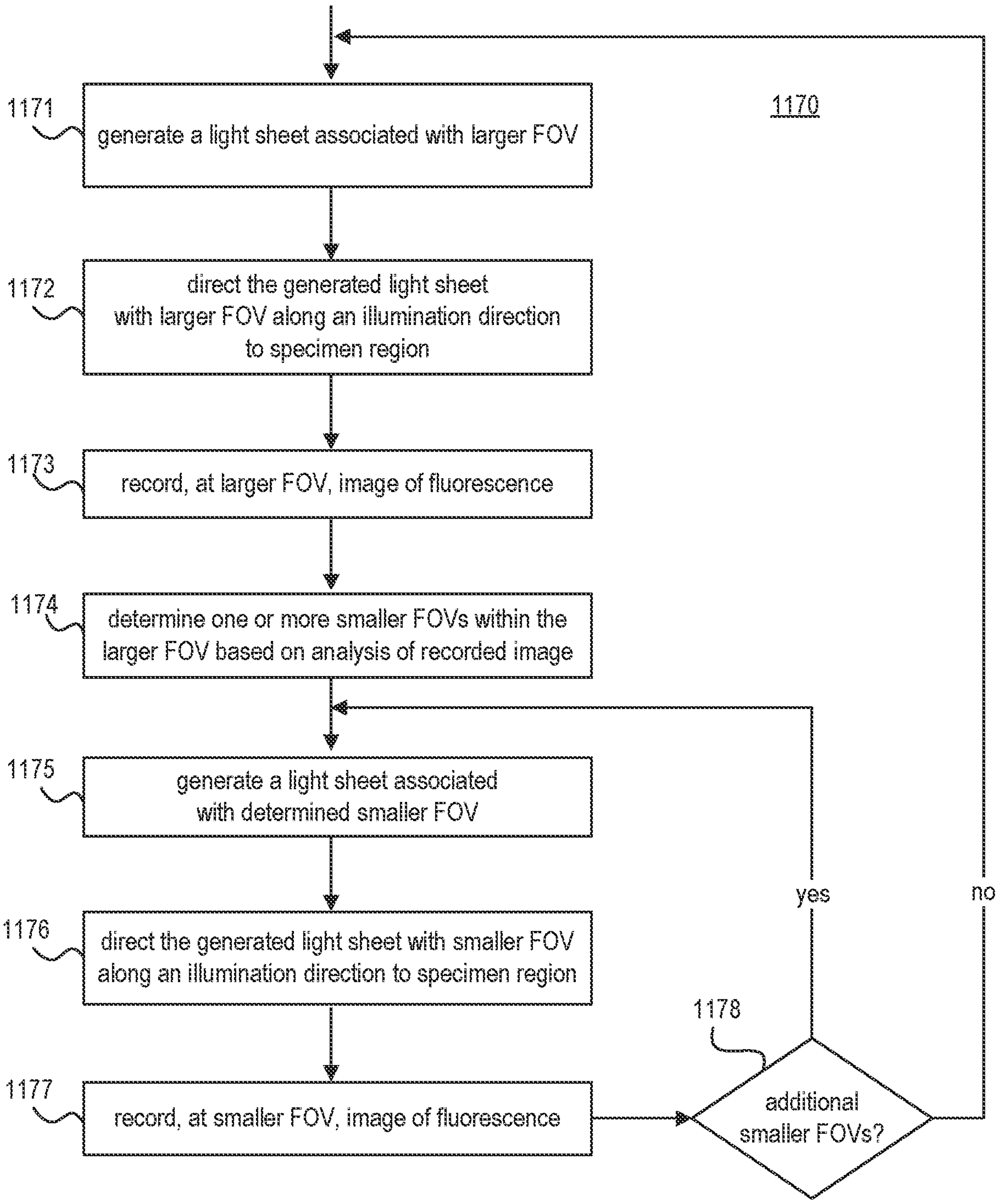
FIG. 11 is a flow chart of a procedure performed by any of the microscope systems of FIGS. 1, 3, 4A, and 8.

Referring to FIG. 11, a procedure 1170 is performed by the microscope system 100, 300, 400, or 800. Reference is made to the various microscope systems 100, 300, and 400 when discussing the procedure 1170. The procedure 1170 can correspond to one imaging cycle associated with the specimen in the specimen region 340. The imaging cycle is discussed in more detail below.

Initially, at least one light sheet 105 associated with a larger field of view (referred to as "FOV" in FIG. 11) of the imaging device 130A is generated (1171). For example, the control system 460 (via the actuation apparatus 462) can instruct the light source 411 to produce the light beam 401 and can also send instructions to the spatial adjustment apparatus 412 (via the illumination mode module 1063) to operate in the mode that is associated with the larger field of view. In this example, the spatial adjustment apparatus 412 operates in the A mode, which corresponds to a spatial status A of the light sheet 405A (having a volume A), and the larger field of view. The optical scanner device 415 can generate the light sheet 405A having the larger field of view from the light beam 401, as discussed above. The generated light sheet 405A having the larger field of view is directed to the specimen region 440 along the illumination direction, which is parallel with the Y axis, (FIG. 6C) (1172). For example, the light sheet 405A output from the optical scanner device 415 is focused to the specimen region 440 by way of the f-theta lens 416, the tube lens 417, and the illumination objective 418.

Figure 12B:
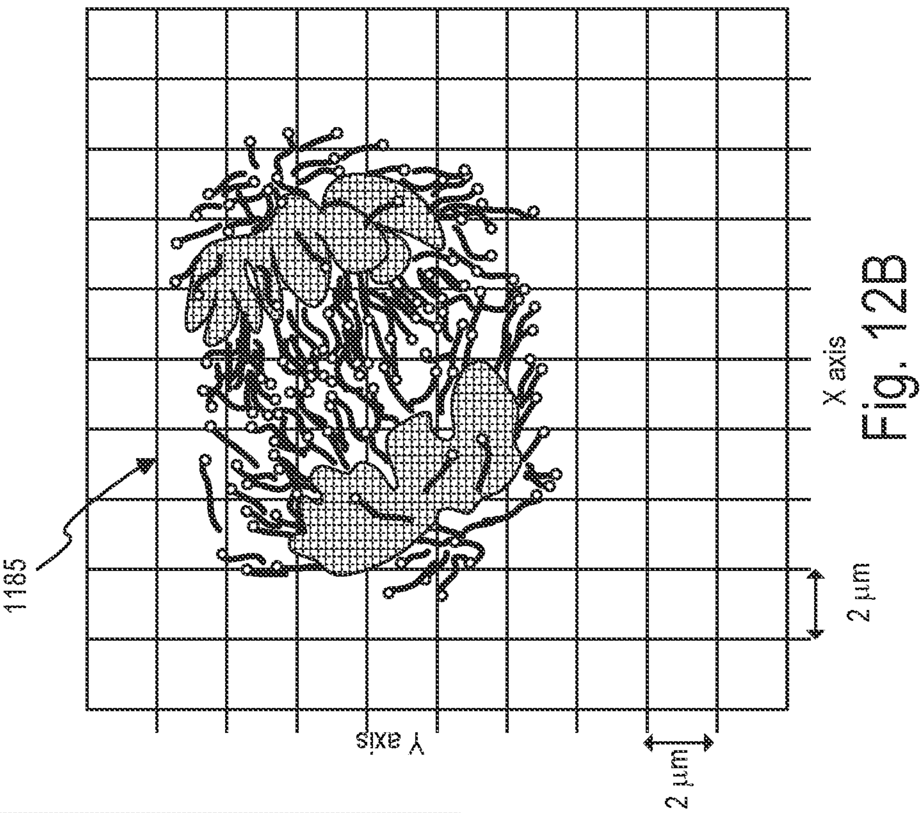
FIG. 12B is a two-dimensional image taking at the smaller field of view of the zebrafish embryo of FIG. 6A and showing details of the individual cell cluster.
Figure 12A:
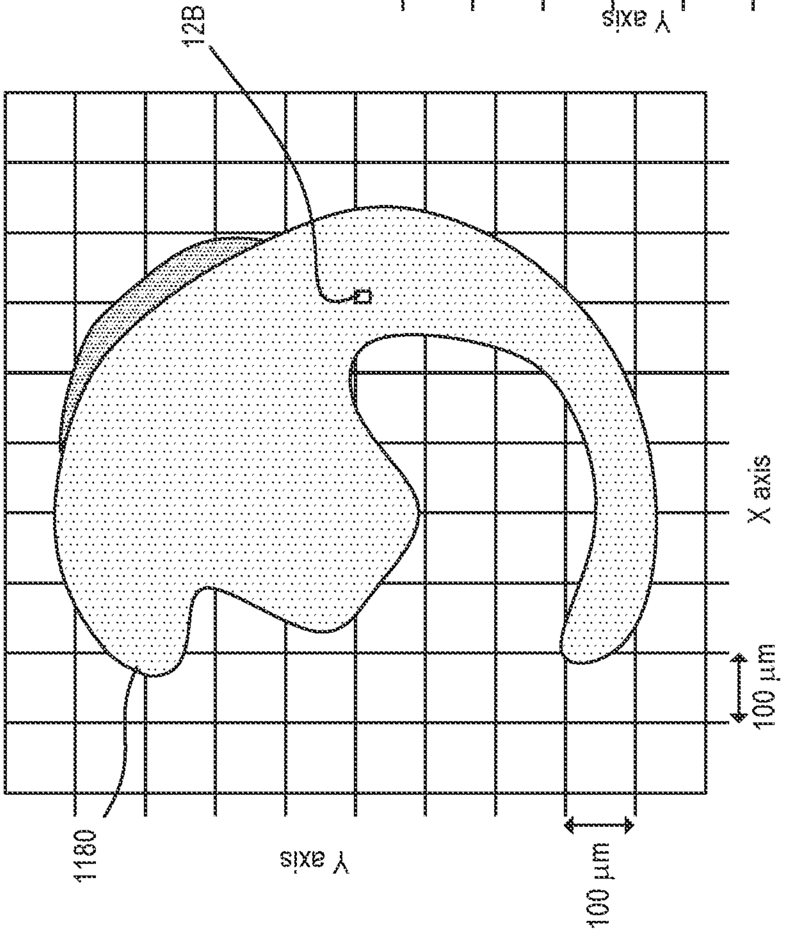
FIG. 12A is a two-dimensional image taking at the larger field of view of the zebrafish embryo of FIGS. 6A-6C.

The image or images of fluorescence 445 are recorded at the larger field of view (1173). For example, the control system 460 (via the actuation apparatus 462 and specifically the detection mode module 1064) sends a signal to the detection subsystem 430 to control operation of the beam steering device 431 to steer the collected fluorescence light 446 to the A path and to the imaging device 430A. The imaging device 430A captures the fluorescence light 446 as an image. In particular, the fluorescence at the XY image plane and a specific location along the Z axis of the specimen region 440 is captured by the imaging device 430A. An example of an image 1180 of the embryo 647 (FIGS. 6A-6C) captured by the imaging device 430A is shown in FIG. 12A.

Normally, after the capture of the image 1180, a microscope would adjust the relative position between the specimen and the light sheet 405 along the Z axis in steps and continue to capture more images at each slice of the specimen at the XY image plane at the Z axis steps. Before moving on to the next Z axis step, the procedure 1170 spends additional time at the current location along the Z axis to focus in on at least one smaller field of view within the larger field of view (of the image 1180) captured by the imaging device 430A. To this end, one or more smaller fields of view within the larger field of view is determined based on the analysis of the recorded image (1174). For example, and with reference to FIG. 12A, the analysis mode module 1068 analyzes the image 1180 of the embryo 647 that was taken along an XY image plane at a specific Z axis location and determine which part of the embryo 647 to focus on next. As an example, the analysis mode module 1068 can identify a population of specific biological activity (such as neuronal activity or cellular activity such as cell division) involved in a particular behavior of interest within the image of the specimen to focus on.

For example, at the beginning of an experiment on a specimen, the analysis mode module 1068 can determine or identify the locations or smaller fields of view within the larger field of view either manually or automatically. A manual determination can include receiving a determination from an operator of the microscope system who examines image data acquired for the specimen at the beginning of the experiment. An automatic determination can include a computational control layer that analyzes in real time the image data taken at the larger field of view to determine the smaller fields of view or regions of interest.

During the experiment on the specimen, the analysis mode module 1068 can update the spatial status or smaller fields of view either manually or automatically. For example, the selection or determination of the smaller fields of view can be based on structural and/or functional changes in the specimen (either by the operator of the microscope system or by the analysis mode module 1068). If the determination occurs automatically, then sets of rules or instructions can be coded by the operator at some point prior to the start of the experiment to define the rules for detecting regions of interest to thereby determine the smaller fields of view. In some implementations, a region of interest can be detected by detecting certain fluorescence characteristics, dynamic changes in signal, spatial patterns, etc. For example, in a developmental/functional imaging context, two different fluorescent markers can be used, where a set of fluorescent markers label all cells and a second set of fluorescent markers label a subset of cells. Evaluating the spatial distribution of the first set of fluorescent markers serves to inform the spatial status for the large field-of-view recording, whereas evaluating the spatial distribution of the second set of fluorescent markers define the settings of the spatial status for the local/small field-of-view recording.

In one example, the analysis mode module 1068 identifies the locations within the image 1080 (the smaller fields of view) using a machine learning approach. In such an approach, the analysis mode module 1068 can initially (prior to an experiment on a specimen) pre-select the smaller fields of view and then calculate how the intensity at each pixel in the image 1080 changes over time.

Once the analysis mode module 1068 identifies the locations within the image 1080, it can inform or provide instructions to the illumination mode module 1063 and the detection mode module 1064 to change, respectively, the operating mode of the spatial adjustment apparatus 112, 312, 412, 812_i/812_ii and the status of the beam steering device 331, 431, 831_i/831_ii to thereby change the field of view to be imaged. Moreover, during this analysis (1174), the analysis mode module 1068 can also determine a location of the light sheet 405A in the specimen region 440, and the instructions to the illumination mode module 1063 to modify the operating mode of the spatial adjustment apparatus 112 can be based on the determined location.

In some implementations, the analysis mode module 1068 analyzes the recorded image of the fluorescence (1174) by analyzing, generating, or creating an image map of the specimen within the larger field of view, and then determining which target location within the image map should be imaged next, and then selecting the smaller field of view based on this determined target location. An image map of the specimen is a map showing and identifying structures and patterns within the specimen that correspond to actual objects within the specimen. For example, for a larval zebrafish, the map can identify the spinal cord and elements of the spinal cord, the cerebellum and elements of the cerebellum, the tectum and elements of the tectum, the habenula and elements of the habenula, and the pallium and elements of the pallium.

The image map can be based on structural information, such as markers identifying certain anatomical regions of the specimen, such as, for example, the spinal cord or the retina. Or, the image map can be based on functional information. For example, a calcium indicator that is expressed by all cells in the brain can be used as a marker; however, by having the specimen (for example, the larval zebrafish) perform a certain behavior, only a subset of the neurons might exhibit an increased calcium signal during imaging, and this subset can be identified as a neuronal sub-population relevant for instructing or executing this particular behavior. In this case, an image map of structures of interest can be determined by such functional information and this can then in turn inform the definition of the small fields of view imaged by the microscope system in higher resolution. Additionally, a certain behavior can be related to a plurality of subsets of the neurons that exhibit increased or decreased calcium signal. One of the subsets of the neurons can be identified as one of the neuronal sub-population relevant for instructing or executing this particular behavior. The microscope system and corresponding method (detailed with respect to the procedure 1170 of FIG. 11), can potentially image more than one subset of neurons.

A light sheet 105 associated with one of the smaller fields of view of the imaging device 130B is generated (1175). In order to generate the light sheet 105 associated with the smaller field of view, the analysis mode module 1068 can find identify specific X, Y, Z locations within the specimen at which the smaller field of view needs to be imaged. Once the X, Y, Z locations are identified, the analysis mode module 1068 can determine specific X, Y, Z locations for the light sheet 105 and convey these X, Y, Z locations to the illumination mode module 1063

The control system 460 (via the actuation apparatus 462) can instruct the light source 411 to produce the light beam 401 and can also send instructions to the spatial adjustment apparatus 412 (via the illumination mode module 1063) to operate in the mode that is associated with the larger field of view. For example, the spatial adjustment apparatus 412 can operate in the B mode, which corresponds to the smaller field of view and corresponds to a spatial status B of the light sheet 405B (having a volume B that is distinct from, for example, smaller than, the volume A). The optical scanner device 415 can generate the light sheet 405B having the smaller field of view from the light beam 401, as discussed above. Moreover, the analysis mode module 1068 can additionally instruct other actuators associated with other optical elements (such as the other optical components 413 including the illumination objective 418) to adjust other aspects of the light sheet 405B or to accommodate for the changes to the field of view of the light sheet 405B.

The volume of the light sheet 405B that interacts with the specimen can be adjusted by adjusting an extent of the light sheet 405B along the X axis and also along the Y axis. For example, the actuation apparatus 462 can control the galvanometer scanners in the optical scanner device 415 to control the displacement of the light beam 401 along the X axis. As another example, the actuation apparatus 462 can instruct the spatial adjustment apparatus 412 (which can be a phase control device such as a spatial light modulator) to apply a lens pattern to the light beam 401 to thereby adjust the focus and the divergence/convergence along the Y direction.

The generated light sheet 405B having the smaller field of view is directed to the specimen region 440 along the illumination direction, which is parallel with the Y axis, (FIG. 7C) (1176). For example, the light sheet 405B output from the optical scanner device 415 is focused to the specimen region 440 by way of the f-theta lens 416, the tube lens 417, and the illumination objective 418.

The image or images of fluorescence 445 are recorded at the smaller field of view (1177). For example, the control system 460 (via the actuation apparatus 462 and specifically the detection mode module 1064) sends a signal to the detection subsystem 430 to control operation of the beam steering device 431 to steer the collected fluorescence light 446 to the B path and to the imaging device 430B. The imaging device 430B captures the fluorescence light 446 as an image. In particular, the fluorescence at the XY image plane and the specific location along the Z axis of the specimen region 440 is captured by the imaging device 430B. An example of an image 1185 of cell division 747 (FIGS. 7A-7C) captured by the imaging device 430B is shown in FIG. 12B.

In some implementations, the image or images of the fluorescence 445 at the smaller field of view are recorded (1177) at a resolution that is higher than the resolution at which the images at the larger field of view are recorded (1173). The temporal resolution at which the images of fluorescence 445 at the smaller field of view are recorded (1177) can be on the order of a millisecond. In some implementations, the image or images of fluorescence 445 that are recorded at the larger field of view (1173) are recorded at a lower resolution that captures activity of cells within the specimen (though not necessarily the structure within the cells). On the other hand, the image or images of fluorescence 445 that are recorded at the smaller field of view (1177) are recorded at a higher resolution that captures neuronal activity.

Next, the procedure 1170 includes determining whether there are additional smaller fields of view that need to be imaged (1178). For example, if, at step 1174, the analysis mode module 1068 analyzes the image 1180 of the embryo 647 that was taken along an XY image plane at the specific Z axis location and determines there are three parts of the embryo 647 to focus on next, then the analysis mode module 1068 identifies the three locations within the image 1080, and it can inform or provide instructions to the illumination mode module 1063 and the detection mode module 1064 to change, respectively, the operating mode of the spatial adjustment apparatus 112, 312, 412, 812_i/812_ii and the status of the beam steering device 331, 431, 831_i/831_ii three times to thereby change the field of view to be imaged to each of these smaller fields of view. In this way, steps 1175-1177 are repeated at this point until all of the smaller fields of view that need to be imaged are imaged (1178). At this point, and if all of the smaller fields of view have been imaged, then the procedure can return to step 1171, after taking a step along the Z axis to start imaging another XY image plane of the specimen at the larger field of view.

In the implementation in which the microscope system 800 is performing the procedure 1170, then step 1171 involves generating the two opposing light sheets 805A_i, 805A_ii and step 1172 involves directing these two opposing light sheets 805A_i, 805A_ii to the specimen in the specimen region 840. In some implementations, the two opposing light sheets 805A_i, 805A_ii temporally overlap with each other in the specimen region 840 while in other implementations, the two opposing light sheets 805A_i, 805A_ii arrive sequentially in time in the specimen region 840. Additionally, step 1173 involves recording an image of the fluorescence at each of the opposing detection subsystems 830_i, 830_ii, and specifically at imaging devices 830A_i, 830A_ii. Step 1175 involves generating the two opposing light sheets 805B_i, 805B_ii at the smaller field of view, and the step 1176 involves directing these two opposing light sheets 805B_i, 805B_ii to the specimen in the specimen region 840. Lastly, step 1177 involves recording an image of the fluorescence at each of the opposing detection subsystems 830_i, 830_ii, and specifically at imaging devices 830B_i, 830B_ii.

The time required to cycle through steps 1171-1178 can be about 6 millisecond (ms). For example, before step 1171, the starting time is 0 ms. The recording of the fluorescence at the larger field of view (step 1173) can start at 1 ms. The recording of the fluorescence at the first smaller field of view (first loop through step 1177) can begin at 2 ms. By 6 ms, all of the smaller fields of view are completed and 1173 can begin for the next larger field of view to be imaged. The maximum acquisition speed of the imaging devices within the detection subsystem (or subsystems) can be maintained at both the larger field of view and the smaller field of view. The procedure 1170 (and therefore the control system 1060) maximizes the duty cycle of the microscope system. For example, each imaging device 130A has some downtime, during which an image is read out for digitalization and transmission to the control system 1060, and during this downtime, another imaging device 130B can integrate the signal, such that the microscope system is always in a state of collecting fluorescence signal for the purpose of image formation, even though only a subset of the imaging devices is available for this task at any point in time.

One all of the larger fields of view (and steps along the Z axis) are recorded, then the procedure 1170 can further include creating a three-dimensional image of the specimen based on the images (both the larger field of view images at step 1173 and the smaller field of view images at step 1177).

In other implementations the procedure 1170 includes a preliminary image phase in which only information at the larger field of view is captured and a guidance map for picking up the imaging area at the smaller field of view is formed. This can be a useful preliminary step whenever single plane analysis cannot accurately (or solely) determine the region of interest for the smaller field-of-view imaging.

The microscope system 100 (as well as 300, 400, 800) and the procedure 1170 enables, for example, multiscale interrogation of smaller fields of view (such as neuronal circuits) in live biological specimen with optically transparent brains. In particular, in biological specimen, usually only 10% of the neurons fire at the same time. Thus, the microscope system 100, 300, 400, 800 and procedure can maximize or increase imaging capacity while acquiring imaging at desired resolution as needed.

The microscope system 100 (300, 400, 800) and the procedure 1170 enables such neuronal activity at the synaptic (smaller field of view) and cellular (larger field of view) levels to be captured simultaneously. Thus, brain-wide cellular imaging can be performed to generate a global, dynamic map of neuronal activity that can be used by the control system (460, 860) to identify populations of neurons actively involved in specific behaviors by using online computation. The map is used in real time (at step 1174) to guide the higher resolution (for example, sub-micrometer, local scale) imaging within functionally active regions to capture the neurotransmitter dynamics of individual neurons. For example, this can be done by imaging glutamate and GABA labeled with biosensors. Through spatiotemporal beam shaping (by way of the spatial adjustment apparatus 112) of the light sheet 105 or light sheets for local scale imaging, multiple functional active regions (for example, two or three) can be targeted in parallel. Simultaneously measuring dynamics across spatial scales in this way can make it possible to study system-wide behavior associated neuron activities and how individual neurons in a circuit integrate their numerous inputs into output signals.

Figure 13:
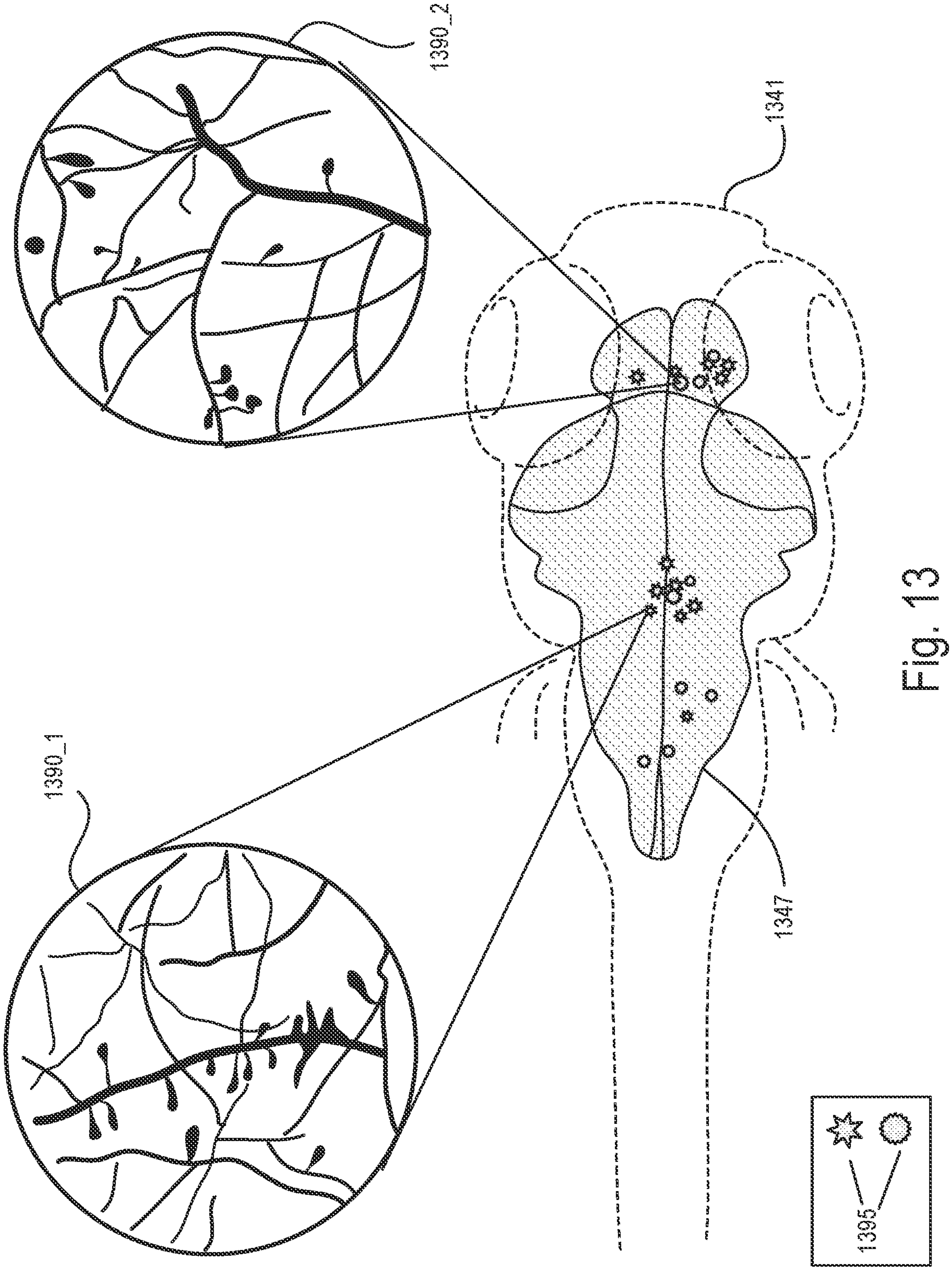
FIG. 13 shows an image of a brain of a larval zebrafish corresponding to a larger field of view of the larval zebrafish as well as two smaller fields of view that were selected by the microscope system to image, the smaller fields of view corresponding to neuronal activity.

FIG. 13 shows an example of using the microscope system 100 (300, 400, 800) and the procedure 1170 to capture such neuronal activity at the synaptic (smaller field of view) and cellular (larger field of view) levels simultaneously. In FIG. 13, the microscope system 100 has created a global, dynamic map of neuronal activity of a larval zebrafish 1341. In this example, the brain 1347 is imaged and the outline of the larval zebrafish 1341 is shown by the dashed line. The brain 1347 is roughly 800×600×200 μm. A two-dimensional image 1380 of the brain 1347 (a slice in the XY plane) is captured at one point in time (step 1173 in the procedure 1170). This image 1380 corresponds to the larger field of view of the larval zebrafish 1341. The analysis mode module 1068 analyzes this image 1380 and determines one or more smaller fields of view 1390_1 and 1390_2 within the larger field of view (step 1174 in the procedure 1170). The analysis mode module 1068 can determine these smaller fields of view 1390_1, 1390_2 by identifying populations 1395 of specific biological activity within the image 1380. In this particular example, these biological activities 1395 that are identified correspond to neuronal activity (at specific neuronal circuits or populations). These particular biological activities 1395 show up in the image 1380 because the intensity at the pixels in these regions of the image 1380 are changing more rapidly relative to a prior point in time or relative to other pixels in the image 1380.

What is claimed is:

1. A microscope system comprising:

at least one illumination subsystem configured to produce and direct a light sheet toward a specimen region, wherein the illumination subsystem includes a spatial adjustment apparatus configured to operate in a plurality of different modes, each operating mode corresponds to a specific spatial status of the light sheet produced by the illumination subsystem;

at least one detection subsystem arranged to collect fluorescence emitted from the specimen region due to an interaction between a specimen at the specimen region and the light sheet, the at least one detection subsystem comprising:

a plurality of imaging devices, with each imaging device being associated with a specific spatial status such that each imaging device is configured to record images of the fluorescence due to an interaction between a specimen at the specimen region and the light sheet with the associated spatial status; and a beam steering device configured to switch the path of fluorescence to the imaging device associated with the spatial status of the light sheet that is selected by the operating mode of the spatial adjustment apparatus; and a control system in communication with the at least one illumination subsystem and the at least one detection subsystem, wherein the control system is configured to select and implement a second spatial status of the light sheet by selecting a pre-determined spatial status associated with the first spatial status.

2. The microscope system of claim 1, wherein the illumination subsystem comprises a light source and a set of illumination optical devices, at least some of the illumination optical devices forming the spatial adjustment apparatus.

3. The microscope system of claim 1, wherein at least one of the spatial statuses of the light sheet is a large field of view and at least one of the spatial statuses of the light sheet is a small field of view.

4. The microscope system of claim 3, wherein the spatial status of the light sheet at the large field of view produces images at a resolution that captures cellular structure within a biological specimen, and the spatial status of the light sheet at the small field of view produces images at sub-micron resolution.

5. The microscope system of claim 1, wherein each spatial status of the light sheet defines a different field of view and a different resolution of the light sheet, and an imaging device being associated with a particular spatial status has an optical spatial resolution and a magnification that is associated with the particular field of view and resolution of the light sheet with that particular spatial status.

6. The microscope system of claim 1, wherein images of fluorescence recorded at a first imaging device provide a large field of view map of a specimen at the specimen region, and the control system selects one or more pre-determined small fields of view of the specimen to image with a second imaging device, each small field of view being smaller than the large field of view.

7. The microscope system of claim 1, wherein the control system comprises an imaging module configured to create a three-dimensional image of the specimen based on the recorded images of fluorescence.

8. The microscope system of claim 1, wherein the control system comprises:

an imaging module configured to analyze images from each imaging device; and an illumination mode module that is configured to send a signal to the illumination subsystem to control operation of the spatial adjustment apparatus based on the analysis performed by the imaging module.

9. The microscope system of claim 8, wherein the imaging module being configured to analyze images from each imaging device comprises the imaging module being configured to determine a location of the light sheet in the specimen region, and the illumination mode module being configured to send the signal to the illumination subsystem comprises instructing a modification of the spatial adjustment apparatus based on the determined light sheet location.

10. The microscope system of claim 1, wherein:

the light sheet is directed toward the specimen region along an illumination direction that is parallel with an illumination axis; and the at least one detection subsystem is arranged to collect fluorescence emitted from the specimen region along a detection collection direction that is divergent with or perpendicular to the illumination axis.

11. The microscope system of claim 10, wherein the at least one detection subsystem comprises a plurality of detection subsystems, with each detection subsystem being arranged to collect fluorescence emitted from the specimen region along a detection collection direction that is divergent with or perpendicular to the illumination axis.

12. The microscope system of claim 10, wherein the at least one illumination subsystem comprises a plurality of illumination subsystems, with each illumination subsystem being configured to produce and direct a respective light sheet toward the specimen region along a respective illumination direction that is parallel with the illumination axis.

13. The microscope system of claim 1, wherein each spatial adjustment apparatus comprises a beam shaping apparatus configured to control a volume of the light sheet within the specimen region, wherein a spatial status of the light sheet is defined at least in part by the shape of the light sheet and/or the volume of the light sheet within the specimen region.

14. The microscope system of claim 13, wherein the beam shaping apparatus comprises a phase control device.

15. The microscope system of claim 14, wherein the phase control device comprises a spatial light modulator, a deformable device, a digital micro-mirror device, or a dielectric optical metasurface.

16. The microscope system of claim 1, wherein the illumination subsystem comprises an illumination objective in direct optical path adjacent the specimen region and the detection subsystem comprises a detection objective in direct optical path adjacent the specimen region.

17. The microscope system of claim 16, wherein the spatial adjustment apparatus excludes the illumination objective.

18. The microscope system of claim 1, wherein each imaging device of the detection subsystem is associated with a respective focus adjustment apparatus configured to independently adjust a focus of the fluorescence at the imaging device.

19. A microscope system comprising:

at least one illumination subsystem configured to produce and direct a light sheet toward a specimen region, wherein the illumination subsystem includes a spatial adjustment apparatus configured to operate in a plurality of different modes, each operating mode corresponds to a specific spatial status of the light sheet produced by the illumination subsystem;

at least one detection subsystem arranged to collect fluorescence emitted from the specimen region due to an interaction between a specimen at the specimen region and the light sheet, the at least one detection subsystem comprising a plurality of imaging devices, with each imaging device being associated with a specific spatial status such that each imaging device is configured to record images of the fluorescence due to an interaction between a specimen at the specimen region and the light sheet with the associated spatial status; and a control system in communication with the at least one illumination subsystem and the at least one detection subsystem, wherein the control system is configured to select and implement a second spatial status of the light sheet based on an analysis of an image of fluorescence recorded at a first imaging device due to the interaction at the specimen region between the specimen and the light sheet operating in a first spatial status.

20. A microscope system comprising:

at least one illumination subsystem configured to produce and direct a light sheet toward a specimen region, wherein the illumination subsystem includes a spatial adjustment apparatus configured to operate in a plurality of different modes, each operating mode corresponds to a specific spatial status of the light sheet produced by the illumination subsystem;

at least one detection subsystem arranged to collect fluorescence emitted from the specimen region due to an interaction between a specimen at the specimen region and the light sheet, the at least one detection subsystem comprising a plurality of imaging devices, with each imaging device being associated with a specific spatial status such that each imaging device is configured to record images of the fluorescence due to an interaction between a specimen at the specimen region and the light sheet with the associated spatial status; and a control system in communication with the at least one illumination subsystem and the at least one detection subsystem, wherein images of fluorescence recorded at a first imaging device provide a large field of view map of a specimen at the specimen region, and the control system analyzes the large field of view map to determine a small field of view of the specimen to image with a second imaging device, the small field of view being smaller than the large field of view.

21. A method of imaging a specimen at a specimen region, the method comprising:

generating a light sheet associated with a larger field of view within the specimen region and directing the light sheet associated with the larger field of view along an illumination direction that is parallel with an illumination axis to the specimen region;

recording, at the larger field of view, an image of fluorescence emitted along a detection direction that is parallel with a detection axis that is divergent with or perpendicular with the illumination axis, the fluorescence emitted from a specimen in the specimen region due to an interaction between the light sheet associated with the larger field of view and the specimen;

determining a smaller field of view within the larger field of view based on an analysis of the recorded image of fluorescence at the larger field of view;

generating a light sheet associated with the determined smaller field of view within the specimen region and directing the light sheet associated with the determined smaller field of view along the illumination direction that is parallel with the illumination axis to the specimen region;

recording, at the smaller field of view, an image of fluorescence emitted along the detection direction that is parallel with the detection axis, the fluorescence emitted from a specimen in the specimen region due to an interaction between the light sheet associated with the smaller field of view and the specimen; and analyzing the recorded image of fluorescence at the larger field of view including creating an image map of the specimen within the larger field of view, determining which target location within the image map should be imaged next, and selecting the smaller field of view based on the determined target location.

22. The method of claim 21, wherein determining the smaller field of view within the larger field of view based on the analysis of the recorded image of fluorescence at the larger field of view comprises determining a plurality of smaller fields of view within the specimen region based on the analysis of the recorded image of fluorescence at the larger field of view.

23. The method of claim 22, wherein generating the light sheet associated with the determined smaller field of view within the specimen region and directing the light sheet associated with the determined smaller field of view along the illumin ation direction that is parallel with the illumination axis to the specimen region comprises generating a plurality of light sheets, each light sheet associated with one of the determined smaller fields of view within the specimen region and directing each of the light sheets associated with the determined smaller fields of view along the illumination direction that is parallel with the illumination axis to the specimen region.

24. The method of claim 23, wherein directing the plurality of light sheets associated with the smaller fields of view along the illumination direction that is parallel with the illumination axis comprises directing the plurality of light sheets associated with the smaller fields of view such that they temporally overlap with each other in the specimen region and spatially overlap with the larger field of view within the specimen region.

25. The method of claim 23, wherein directing the plurality of light sheets associated with each smaller field of view along the illumination direction comprises directing the plurality of light sheets associated with each smaller field of view such that they arrive sequentially in time in the specimen region.

26. The method of claim 21, wherein recording, at the smaller field of view, an image of fluorescence emitted along the detection direction that is parallel with the detection axis comprises recording the image at a resolution that is higher than a resolution at which the image of fluorescence is recorded at the larger field of view.

27. The method of claim 21, wherein generating the light sheet associated with the larger field of view within the specimen region comprises generating a plurality of light sheets associated with the larger field of view within the specimen region, and directing the light sheet associated with the larger field of view along the illumination direction comprises directing the plurality of light sheets associated with the larger field of view along respective illumination directions, each illumination direction being parallel with the illumination axis.

28. The method of claim 27, wherein the respective illumination directions are opposite to each other.

29. The method of claim 21, wherein recording, at the larger field of view, the image of fluorescence emitted along the detection direction that is parallel with the detection axis comprises recording, at each of a plurality of distinct larger fields of view, an image of fluorescence emitted along a distinct detection direction, each detection direction being parallel with the detection axis that is divergent with or perpendicular with the illumination axis, the fluorescence being emitted from the specimen in the specimen region due to an interaction between the light sheet associated with the larger field of view and the specimen.

30. The method of claim 21, wherein recording, at the smaller field of view, the image of fluorescence emitted along the detection direction that is parallel with the detection axis comprises recording, at each of a plurality of distinct smaller fields of view, an image of fluorescence emitted along a distinct detection direction, each detection direction being parallel with the detection axis that is divergent with or perpendicular with the illumination axis, the fluorescence being emitted from the specimen in the specimen region due to an interaction between the light sheet associated with the smaller field of view and the specimen.

31. The method of claim 21, wherein recording, at the smaller field of view, the image of fluorescence comprises recording at a temporal resolution on the order of a millisecond.

32. The method of claim 21, wherein recording, at the larger field of view, the image of fluorescence comprises recording at a lower resolution that captures activity of cells within the specimen; and recording, at the smaller field of view, the image of fluorescence comprise recording at a higher resolution that captures neuronal activity within the larger field of view of the specimen.

33. The method of claim 32, wherein determining which target location within the image map should be imaged next comprises identifying a population of neuronal activity involved in a behavior of interest.

34. The method of claim 33, further comprising creating a three-dimensional image of the specimen based on the recorded images of fluorescence.

35. The method of claim 21, further comprising sequentially selecting larger fields of view within the specimen region, and for each larger field of view, performing:

generating a light sheet associated with the larger field of view within the specimen region and directing the light sheet associated with the larger field of view along an illumination direction that is parallel with the illumination axis to the specimen region;

recording, at the larger field of view, an image of fluorescence emitted along a detection direction that is parallel with the detection axis, the fluorescence emitted from the specimen in the specimen region due to an interaction between the light sheet associated with the larger field of view and the specimen;

determining a smaller field of view within the larger field of view based on an analysis of the recorded image of fluorescence at the larger field of view;

generating a light sheet associated with the determined smaller field of view within the specimen region and directing the light sheet associated with the determined smaller field of view along the illumination direction; and recording, at the smaller field of view, an image of fluorescence emitted along the detection direction, the fluorescence emitted from the specimen in the specimen region due to an interaction between the light sheets associated with the smaller field of view and the specimen.

36. The method of claim 21, wherein generating the light sheet associated with the larger field of view within the specimen region comprises generating the light sheet having a first spatial status and generating the light sheet associated with the smaller field of view within the specimen region comprises generating the light sheet having a second spatial status that is different from the first spatial status.

37. The method of claim 36, wherein the first spatial status corresponds to a first volume of the light sheet that interacts with the specimen in the specimen region and the second spatial status corresponds to a second volume of the light sheet that interacts with the specimen in the specimen region.

* * * * *